United States Patent
Jeong et al.

(10) Patent No.: US 8,390,773 B2
(45) Date of Patent: Mar. 5, 2013

(54) LIQUID CRYSTAL DISPLAY PANEL AND METHOD OF MANUFACTURING THE SAME

(75) Inventors: Youn-Hak Jeong, Cheonan-si (KR); Keun-Chan Oh, Cheonan-si (KR); Yeon-Sik Ham, Suwon-si (KR); Dong-Gi Seong, Seongnam-si (KR); Kang-Woo Kim, Seoul (KR); Yeon-Mun Jeon, Iksan-si (KR); Hee-Hwan Lee, Busan (KR)

(73) Assignee: Samsung Display Co., Ltd. (KR)

( * ) Notice: Subject to any disclaimer, the term of this patent is extended or adjusted under 35 U.S.C. 154(b) by 810 days.

(21) Appl. No.: 12/469,211

(22) Filed: May 20, 2009

(65) Prior Publication Data

US 2010/0053518 A1    Mar. 4, 2010

(30) Foreign Application Priority Data

Aug. 27, 2008  (KR) .................................. 2008-83715

(51) Int. Cl.
    *G02F 1/1335*    (2006.01)
(52) U.S. Cl. ........................................ 349/114; 349/144
(58) Field of Classification Search .................. None
    See application file for complete search history.

(56) References Cited

U.S. PATENT DOCUMENTS

| | | | |
|---|---|---|---|
| 7,643,115 B2 * | 1/2010 | Sato et al. | 349/114 |
| 2007/0222925 A1 * | 9/2007 | Park et al. | 349/114 |
| 2007/0268440 A1 * | 11/2007 | Nagano | 349/141 |
| 2008/0002071 A1 * | 1/2008 | Park | 349/33 |
| 2009/0262288 A1 * | 10/2009 | Tsuchiya | 349/114 |

FOREIGN PATENT DOCUMENTS

| | | |
|---|---|---|
| JP | 2004341524 A | 12/2004 |
| JP | 2006153978 A | 6/2006 |
| KR | 1020080003197 A | 1/2008 |

* cited by examiner

*Primary Examiner* — Hemang Sanghavi
(74) *Attorney, Agent, or Firm* — Cantor Colburn LLP

(57) ABSTRACT

A liquid crystal display panel includes; an array substrate including a pixel electrode disposed in a pixel area, the pixel electrode including a reflective electrode disposed in a reflective area of the pixel area and a transparent electrode disposed in a transmissive area of the pixel area, at least one of the reflective electrode and the transparent electrode including a plurality of first slit electrodes, an opposite substrate including a first common electrode disposed in alignment with the reflective area, the first common electrode including a plurality of second slit electrodes each having a width wider than that of an individual first slit electrode of the plurality of first slit electrodes, and a liquid crystal layer interposed between the array substrate and the opposite substrate.

18 Claims, 24 Drawing Sheets

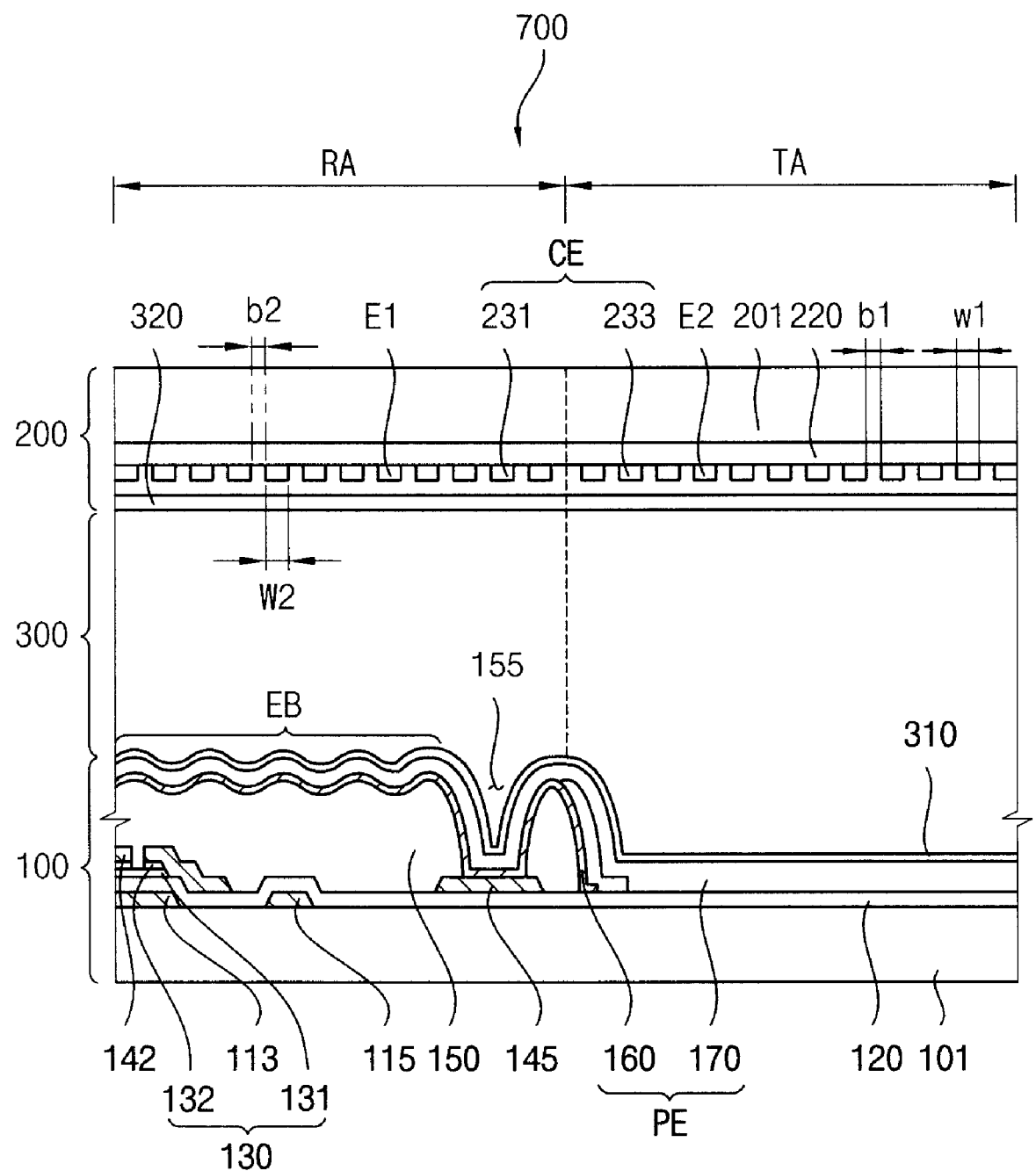

LIQUID CRYSTAL DISPLAY PANEL AND METHOD OF MANUFACTURING THE SAME

This application claims priority to Korean Patent Application No. 2008-83715, filed on Aug. 27, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a liquid crystal display ("LCD") panel and a method of manufacturing the LCD panel. More particularly, exemplary embodiments of the present invention relate to an LCD panel used in a transflective-type LCD device and a method of manufacturing the LCD panel.

2. Description of the Related Art

Generally, a liquid crystal display ("LCD") device may be classified as a transmissive-type LCD device, a reflective-type LCD device or a transflective-type LCD device. Due to high visibility and color reproducibility of the transmissive-type LCD device in an indoor space, the transmissive-type LCD device has been widely used. However, the visibility of the transmissive-type LCD device is decreased outdoors, and power consumption of the transmissive-type LCD device is high.

On the other hand, the reflective-type LCD device has high visibility outdoors and does not employ an internal light source, for example, a backlight, so that the reflective-type LCD has the benefit of having low power consumption. However, the visibility of the reflective-type LCD device is decreased in a dark environment, such as an indoor space.

Thus, a transflective-type LCD device has been developed, which has the merits of 75
both the transmissive-type LCD and the reflective-type LCD device. However, the transflective-type LCD has detriments in its optical structure and manufacturing aspects as compared with the transmissive-type LCD and the reflective-type LCD device. That is, a light path passing through a liquid crystal layer only once in a transmissive area of the display; however, in a reflective area of the display incident light is reflected against a reflective plate back to the liquid crystal layer so that the light path in this part of the display passes through the liquid crystal layer at least twice. Thus, a difference of phase delay exists in the two areas.

In order to solve the above problems, the transflective-type LCD is designed so that a cell gap of a liquid crystal layer corresponding to the transmissive area is twice as large as that of a liquid crystal layer corresponding to the reflective area by using a twisted nematic ("TN") mode. However, a liquid crystal film structure, which is used to adjust a light path of a reflective area and a transmissive area and narrow viewing angle of the TN mode, and a rubbing direction of an initial liquid crystal have a low-TN mode that is a TN mode of which an initial twist angle is small, so that transmissivity may be low. In order to overcome the above disadvantages, a vertical alignment mode may be used. However, transmittance versus applied voltage curve (V-T curve) characteristics and reflectivity versus applied voltage curve (V-R curve) characteristics corresponding to the reflective area and the transmissive area may need to be adjusted.

When thin-film transistors ("TFTs") that are independently employed in the reflective area and the transmissive area to adjust V-T curve characteristics and V-R curve characteristics of the reflective and the transmissive areas, an aperture ratio may be decreased and manufacturing costs may be increased. Moreover, when an insulation layer is formed in the reflective area to decrease an electric field for driving liquid crystal molecules, a difference of threshold voltage may be generated at low gradation.

BRIEF SUMMARY OF THE INVENTION

Exemplary embodiments of the present invention provide a liquid crystal display ("LCD") panel capable of enhancing light efficiency and a viewing angle.

Exemplary embodiments of the present invention provide a method of manufacturing the above-mentioned LCD panel.

According to one exemplary embodiment of the present invention, an LCD panel includes; an array substrate including a pixel electrode disposed in a pixel area, the pixel electrode including a reflective electrode disposed in a reflective area of the pixel area and a transparent electrode disposed in a transmissive area of the pixel area, at least one of the reflective electrode and the transparent electrode including a plurality of first slit electrodes, an opposite substrate including a first common electrode disposed in alignment with the reflective area, the first common electrode includes a plurality of second slit electrodes each having a width substantially equal to or wider than that of an individual first slit electrode of the plurality of first slit electrodes, and a liquid crystal layer interposed between the array substrate and the opposite substrate.

According to another exemplary embodiment of the present invention, an LCD panel includes an array substrate including a pixel electrode disposed in a pixel area, the pixel electrode including a reflective electrode disposed in a reflective area of the pixel area and a transparent electrode disposed in a transparent area of the pixel area, only one of the reflective electrode and the transparent electrode including a plurality of first slit electrodes, an opposite substrate including a first common electrode disposed in alignment with the reflective area, the first common electrode including a plurality of second slit electrodes, each having a width wider than that of an individual first slit electrode of the plurality of first slit electrodes, and a liquid crystal layer interposed between the array substrate and the opposite substrate.

According to still another exemplary embodiment of the present invention, an LCD panel includes; an array substrate including a pixel area which is divided into a reflective area and a transmissive area, the array substrate including a reflective electrode disposed in the reflective area, and a transmissive electrode disposed in substantially the entire pixel area in alignment with the reflective electrode, the transmissive electrode having a plurality of slit electrodes, an opposite substrate disposed substantially opposite to the transmissive electrode, and including a common electrode, and a liquid crystal layer interposed between the array substrate and the opposite substrate.

According to still another exemplary embodiment of the present invention, an LCD panel includes an array substrate, an opposite substrate and a liquid crystal layer. The array substrate includes a pixel electrode disposed in a pixel area. The pixel electrode includes a reflective electrode disposed in a reflective area of the pixel area and a transparent electrode disposed in a transmissive area of the pixel area. The opposite substrate includes a first common electrode and a second common electrode. The first common electrode is disposed in alignment with the reflective area. The first common electrode includes a plurality of first slit electrodes. The second common electrode is disposed in alignment with the transparent area. The second common electrode includes a plurality of second slit electrodes. The liquid crystal layer is interposed between the array substrate and the opposite substrate.

According to further still another exemplary embodiment of the present invention, there is provided a method of manufacturing an LCD panel, the method including; providing an array substrate, providing an opposite substrate, disposing a liquid crystal layer having a reactive mesogenic monomer between the array substrate and the opposite substrate, forming a hardened layer having a pretilt angle corresponding to a reflective mode on each of alignment layers of the array substrate and the opposite substrate by irradiating light to the liquid crystal layer when the liquid crystal layer is activated by applying a first voltage to a first common electrode, and forming a hardened layer having a pretilt angle corresponding to a transmissive mode on each of alignment layers of the array substrate and the opposite substrate by irradiating light to the liquid crystal layer when the liquid crystal layer is activated by applying a second voltage to a second common electrode.

According to the above exemplary embodiments of the present invention, a pixel electrode and/or a common electrode having a plurality of slit electrodes formed thereon align liquid crystal in a long axis direction of the slit electrode, so that high transmissivity and high reflectivity may be obtained. Moreover, a wide viewing angle may be obtained.

BRIEF DESCRIPTION OF THE DRAWINGS

The above and other features and advantages of the present invention will become more apparent by describing in detail exemplary embodiments thereof with reference to the accompanying drawings, in which:

FIG. 15 is a cross-sectional view of an exemplary embodiment of an LCD panel according to a third exemplary embodiment of the present invention;

DETAILED DESCRIPTION OF THE INVENTION

Figure 1:
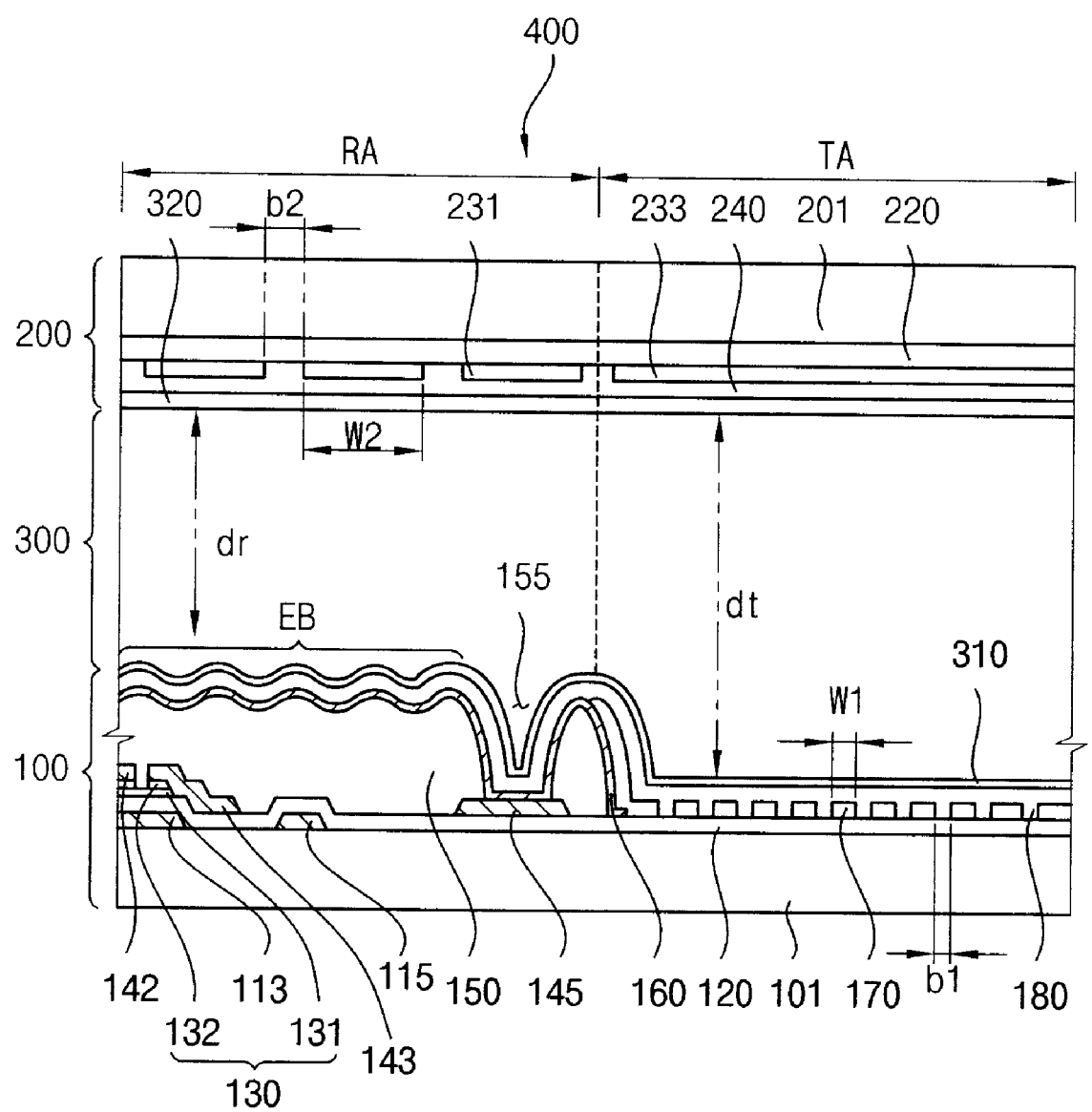
FIG. 1 is a cross-sectional view of an exemplary embodiment of a liquid crystal display ("LCD") panel according to a first exemplary embodiment of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity. Like reference numerals refer to like elements throughout.

It will be understood that when an element is referred to as being "on," "connected to" or "coupled to" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Exemplary Embodiment 1

FIG. 1 is a cross-sectional view of an exemplary embodiment of a liquid crystal display ("LCD") panel 400 according to a first exemplary embodiment of the present invention.

Figure 2A:
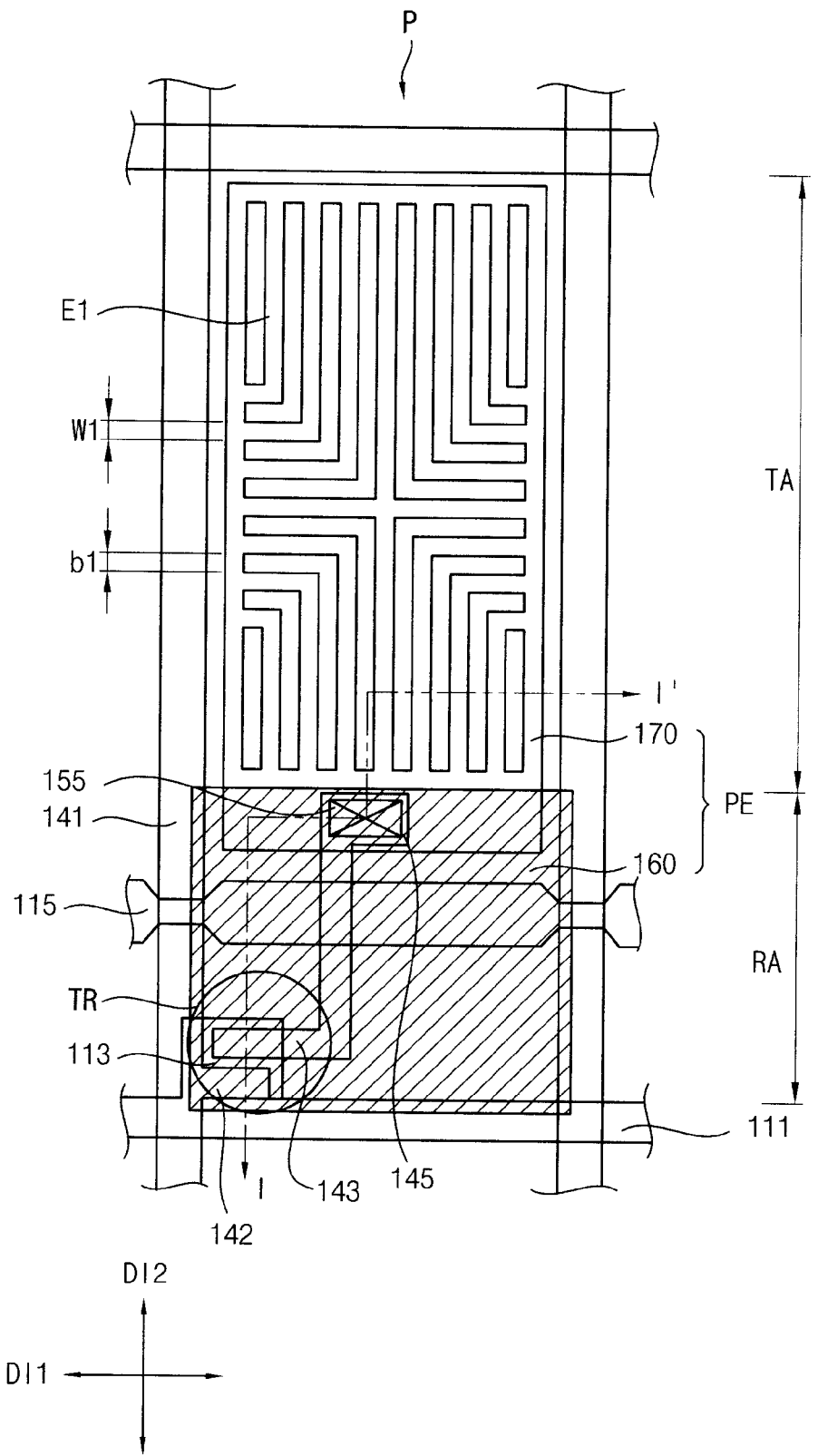
FIG. 2A is a top plan layout view illustrating an exemplary embodiment of an array substrate of FIG. 1.
Figure 2B:
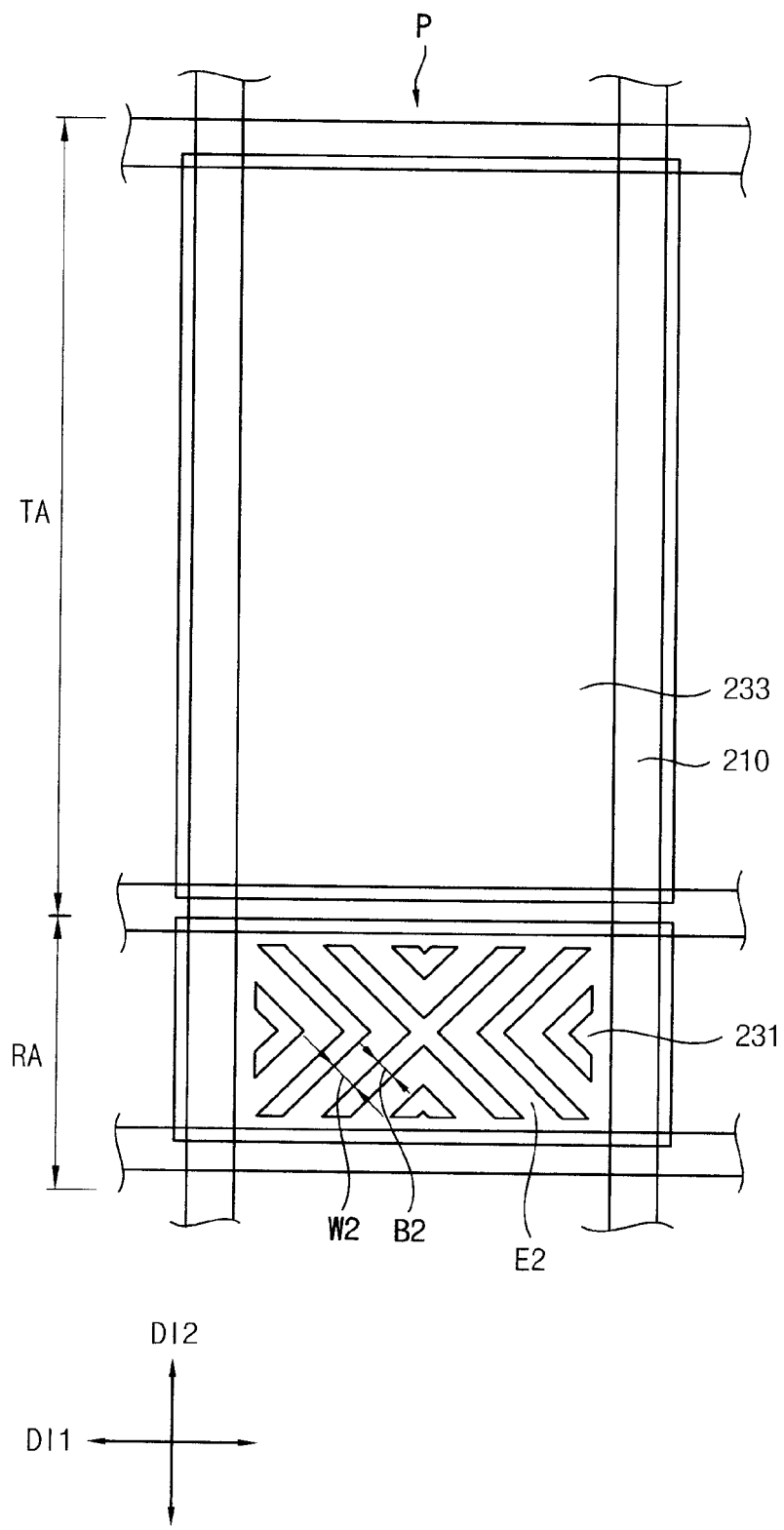
FIG. 2B is a top plan layout view illustrating an exemplary embodiment of an opposite substrate of FIG. 1.

FIG. 2A is a top plan layout view illustrating an exemplary embodiment of an array substrate of FIG. 1. FIG. 2B is a top plan layout view illustrating an opposite substrate of FIG. 1.

Referring to FIGS. 1, 2A and 2B, an LCD panel 400 includes an array substrate 100, an opposite substrate 200 and a liquid crystal layer 300.

The array substrate 100 includes a first base substrate 101, a gate line 111, a storage line 115, a gate insulation layer 120, a data line 141, a switching element TR, an organic layer 150, a reflective electrode 160, a transparent electrode 170 and a first alignment layer 180.

In one exemplary embodiment, the first base substrate 101 includes an optically transparent and electrically conductive material. A plurality of pixel areas is defined on the first base substrate 101. Each of the pixel areas 'P' is divided into a reflective area RA and a transmissive area TA.

The gate line 111 is extended in a first direction DI1, and the storage line 115 is disposed in the reflective area RA and extends substantially in parallel with the gate line 111.

The data line 141 extends in a second direction DI2 substantially perpendicular to the first direction DI1.

The gate insulation layer 120 is disposed on the gate line 111, the storage line 115 and a gate electrode 113 of the switching element TR.

In one exemplary embodiment, the switching element TR is disposed within the reflective area RA. The switching element TR includes the gate electrode 113, a source electrode 142, a channel portion 130 and a drain electrode 143. The gate electrode 113 is electrically connected to the gate line 111, and the source electrode 142 is electrically connected to the data line 141. The channel portion 130 includes a semiconductor layer 131 and an ohmic contact layer 132 that are disposed on the gate electrode 113. The drain electrode 143 is spaced apart from the source electrode 142.

The organic layer 150 is disposed within the reflective area RA of the first base substrate 101 where the switching element TR is formed. In one exemplary embodiment, a surface of the organic layer 150 may have an embossing pattern EB in order to enhance a reflection ratio thereof. The organic layer 150 may have a contact hole 155 exposing a connection electrode 145, which in the present exemplary embodiment may be extended from the drain electrode 143. In one exemplary embodiment, the contact hole 155 may be formed in an area where the reflective electrode 160 and the transparent electrode 170 are overlapped with each other. In the present exemplary embodiment, the organic layer 150 is disposed to form the embossing pattern EB. Alternative exemplary embodiments include configurations wherein the organic layer 150 may be omitted.

In the present exemplary embodiment the reflective electrode 160 is disposed on the organic layer 150. In one exemplary embodiment, the reflective electrode 160 may include an electrically conductive reflecting material which reflects light. The electrically conductive reflecting material may include an optically non-transparent metal material. The reflective electrode 160 is disposed within the pixel area 'P' to form a reflective area RA and a transmissive area TA. In the present exemplary embodiment, the reflective electrode 160 directly makes contact with the connection electrode 145 through the contact hole 155 to be electrically connected to the switching element TR. The reflective electrode 160 may be extended to an adjacent pixel area along the gate line 111, so that a peripheral area of the pixel area 'P' may be utilized as a reflective area. Thus, as the reflective area is increased, the LCD panel 400 may have increased reflection characteristics.

The transparent electrode 170 is electrically connected to the reflective electrode 160 and is disposed on the transmissive area TA. In the present exemplary embodiment, the transparent electrode 170 includes a plurality of first slit electrodes E1. According to the present exemplary embodiment, a width W1 of the first slit electrode E1 may be no more than about 10 μm, and a distance b1 between the first slit electrodes E1 adjacent to each other may be no more than about 10 μm. The first slit electrodes E1 are extended in at least two directions to form a plurality of domains. In the present exemplary embodiment, the first slit electrode E1 extends along the first direction DI1 and has a long axis direction along a second direction DI2. Alternative exemplary embodiments include configurations wherein the first slit electrode may have various directions of extension, sizes, shapes, etc. As a result, the reflective electrode 160 and the transparent electrode 170 may together form a pixel electrode PE formed in the pixel area 'P'.

The first alignment layer 180 is disposed on the reflective electrode 160 and the transparent electrode 170 to vertically arrange liquid crystal molecules of the liquid crystal layer 300 when an electric field is not applied thereto.

The opposite substrate 200 includes a second base substrate 201, a light blocking pattern 210, a color filter 220, a first common electrode 231, a second common electrode 233 and a second alignment layer 240.

The second base substrate 201 includes an optically transparent and electrically conductive material. In the second base substrate 201, a plurality of pixel areas is defined. Each of the pixel areas 'P' is divided into a reflective area RA and a transmissive area TA, similar to the array substrate 100 described above.

The light blocking pattern 210 is disposed on the second base substrate 201 to block light from passing through the liquid crystal layer 300. In one exemplary embodiment, the light blocking pattern 210 may be disposed on the second base substrate 201 corresponding with an area where the gate line 111, the data line 141 and the switching element TR are formed. In another exemplary embodiment, the light blocking pattern 210 may be disposed in a boundary area between the reflective area RA and the transmissive area TA. Alternative exemplary embodiments include configurations wherein the light blocking pattern 210 may be disposed on the second base substrate 201 corresponding with an area where the gate line 111, the data line 141 and the switching element TR are formed and a boundary area between the reflective area RA and the transmissive area TA.

The color filter 220 is disposed on the second base substrate 201 corresponding with the pixel area 'P'.

The first common electrode 231 is disposed on the color filter 220 of the reflective area RA. The first common electrode 231 includes a plurality of second slit electrodes E2. In one exemplary embodiment, each width W2 of the second slit electrode E2 is about 1.5 times a width W1 of the first slit electrode E1, and a distance s2 between adjacent second slit electrodes E2 is no more than about 10 μm. The second slit electrodes E2 are extended in at least two directions to define a plurality of domains. In the present exemplary embodiment, the second slit electrode has a first axis along the first direction DI1 and a long axis direction along the second direction DI2. Alternative exemplary embodiments include configurations wherein the second slit electrode may have various directions. The second common electrode 233 is spaced apart from the first common electrode 231 to be disposed on the color filter 220 corresponding to the transmissive area TA. In one exemplary embodiment, the second common electrode 233 may have a planar structure (or plate structure). The first and second common electrodes 231 and 233 together form a common electrode CE facing the pixel electrode PE disposed in the array substrate 100.

The second alignment layer 240 is disposed on the first and second common electrodes 231 and 233 to vertically arrange liquid crystal molecules of the liquid crystal layer 300 when an electric field is not applied thereto.

In the present exemplary embodiment, the liquid crystal layer 300 includes liquid crystal molecules of a vertically aligned ("VA") mode, a first hardened layer 310 and a second hardened layer 320. For example, a multiplication of a cell gap 'dt' of the liquid crystal layer 300 by a refractive index Δn of liquid crystal molecules may be about 0.25 μm to about 0.6 μm in the transmissive area TA, and a multiplication of a cell gap 'dr' of the liquid crystal layer 300 by a refractive index Δn of liquid crystal molecules may be no more than abut 0.3 μm in the reflective area RA.

The first and second hardened layers 310 and 320 are disposed on the first and second alignment layers 180 and 240 to have a pretilt angle. In one exemplary embodiment, the first hardened layer 310 corresponding to the reflective area RA has a first pretilt angle, and the first hardened layer 310 corresponding to the transmissive area TA has a second pretilt angle. The second hardened layer 320 corresponding to the reflective area RA has a third pretilt angle, and the second hardened layer 320 corresponding to the transmissive area TA has a fourth pretilt angle.

In one exemplary embodiment the first and second hardened layers 310 and 320 may be formed from a reactive mesogenic monomer. In one exemplary embodiment, a first common voltage is applied to the first common electrode 231 and a first pixel voltage is applied to the pixel electrode PE to rotate a liquid crystal, and then ultraviolet ("UV") light is irradiated to form the first and third pretilt angles by forming a reactive mesogenic polymer chain in a predetermined direction on the first and second alignment layers 180 and 240 corresponding to the reflective area RA. In one exemplary embodiment the first common voltage is a voltage corresponding to the maximum luminance of a V-R curve.

Then, a second common voltage is applied to the first common electrode 233 and a second pixel voltage is applied to the pixel electrode PE to rotate a liquid crystal, and then UV light is irradiated to form the second and fourth pretilt angles by forming a reactive mesogenic polymer chain in a predetermined direction on the first and second alignment layers 180 and 240 corresponding to the transmissive area TA. In one exemplary embodiment, the second common voltage is a voltage corresponding to the maximum luminance at a V-T curve. Thus, pretilt angles of the reflective area RA and the transmissive area TA are effectively controlled, so that V-R curve characteristics and V-T curve characteristics may be obtained.

Figure 3:
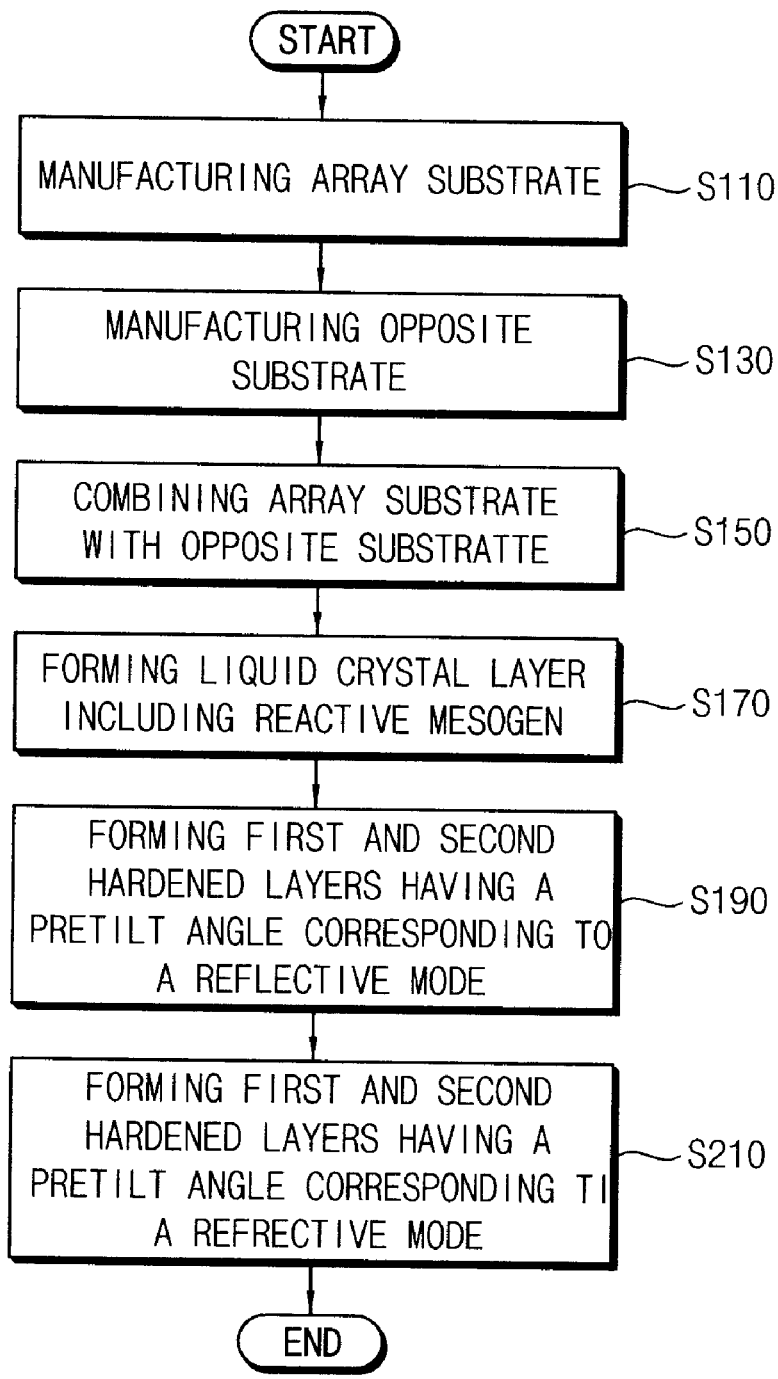
FIG. 3 is a flow chart illustrating an exemplary embodiment of a manufacturing method of an exemplary embodiment of an LCD panel of FIG. 1.

FIG. 3 is a flow chart illustrating an exemplary embodiment of a manufacturing method of an LCD panel of FIG. 1.

Referring to FIGS. 1 to 3, the array substrate 100 is manufactured, which includes the reflective electrode 160 formed in the reflective area RA on the first base substrate 101 and the transparent electrode 170 formed in the transmissive area TA on the first base substrate 101 (step S110).

The opposite substrate 200 is manufactured, which includes the first common electrode 231 formed in the reflective area RA on the second base substrate 201 and the second common electrode 233 formed in the transmissive area TA on the second base substrate 201 (step S130). Alternative exemplary embodiments include configurations wherein the opposite substrate 200 may be manufactured before the array substrate 100.

The array substrate 100 and the opposite substrate 200 are combined with each other by using a sealing member (not shown) (step S150).

Liquid crystal material is injected between the array substrate 100 and the opposite substrate 200 that are combined with each other (step S170). The liquid crystal material may include liquid crystal having a negative refractive index including a reactive mesogenic monomer. Alternative exemplary embodiments include configurations wherein the liquid crystal layer is deposited on the array substrate 100 or the opposite substrate 200 before the substrates are combined in step S150.

In the LCD panel having the liquid crystal material, a first pixel voltage is applied to a pixel electrode PE having the reflective electrode 160 and the transparent electrode 170 and a first common voltage is applied to the first common electrode 231 to drive the reflective area RA in a white mode of a reflective mode. When the reflective area RA is driven in the white mode, UV light is irradiated to form the first and second hardened layers 310 and 320 on the reflective area RA, which have the first and third pretilt angles corresponding to the reflective mode (step S190).

Then, a second pixel voltage is applied to the pixel voltage PE of the LCD panel and a second common voltage is applied to the second electrode 233 to drive the transmissive area TA in a white mode of a transmissive mode. When the transmissive area TA is driven in the white mode, UV light is irradiated to form the first and second hardened layers 310 and 320 on the transmissive area TA, which have the second and fourth pretilt angles in correspondence with the transmissive mode (step S210).

Figure 4:
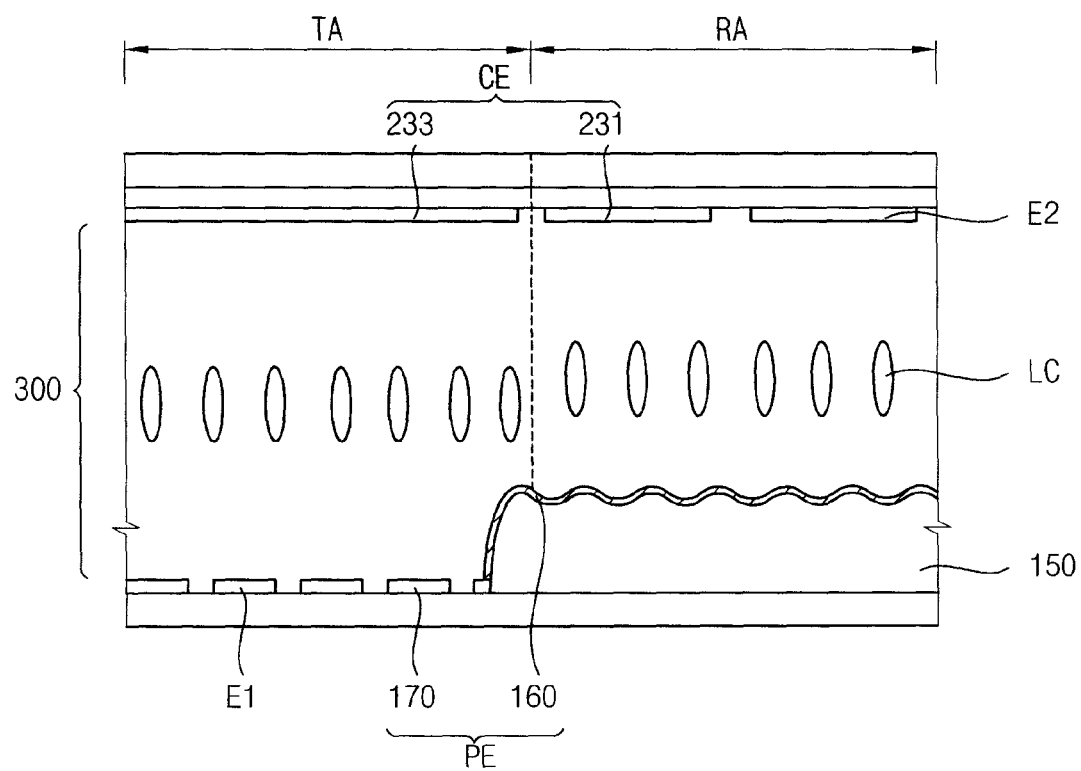
FIG. 4 is a cross-sectional view illustrating an exemplary embodiment of a liquid crystal distribution of the exemplary embodiment of an LCD panel of FIG. 1 when an electric field is not applied thereto.
Figure 5:
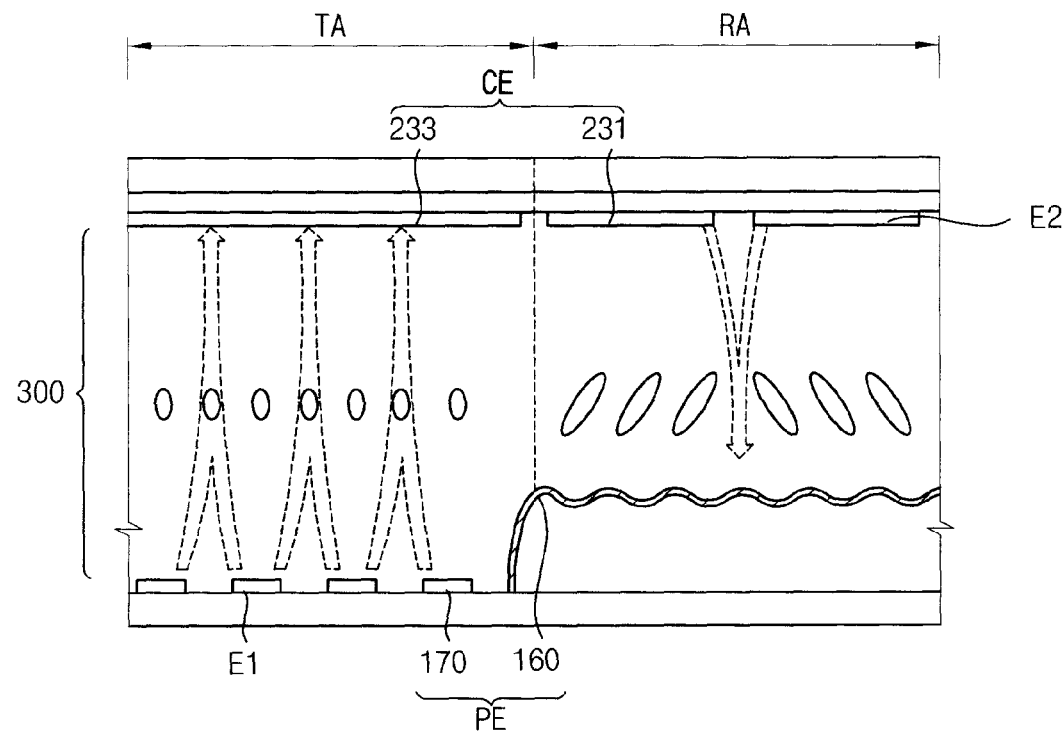
FIG. 5 is a cross-sectional view illustrating an exemplary embodiment of a liquid crystal distribution of the exemplary embodiment of an LCD panel of FIG. 1 when an electric field is applied thereto.
Figure 6A:
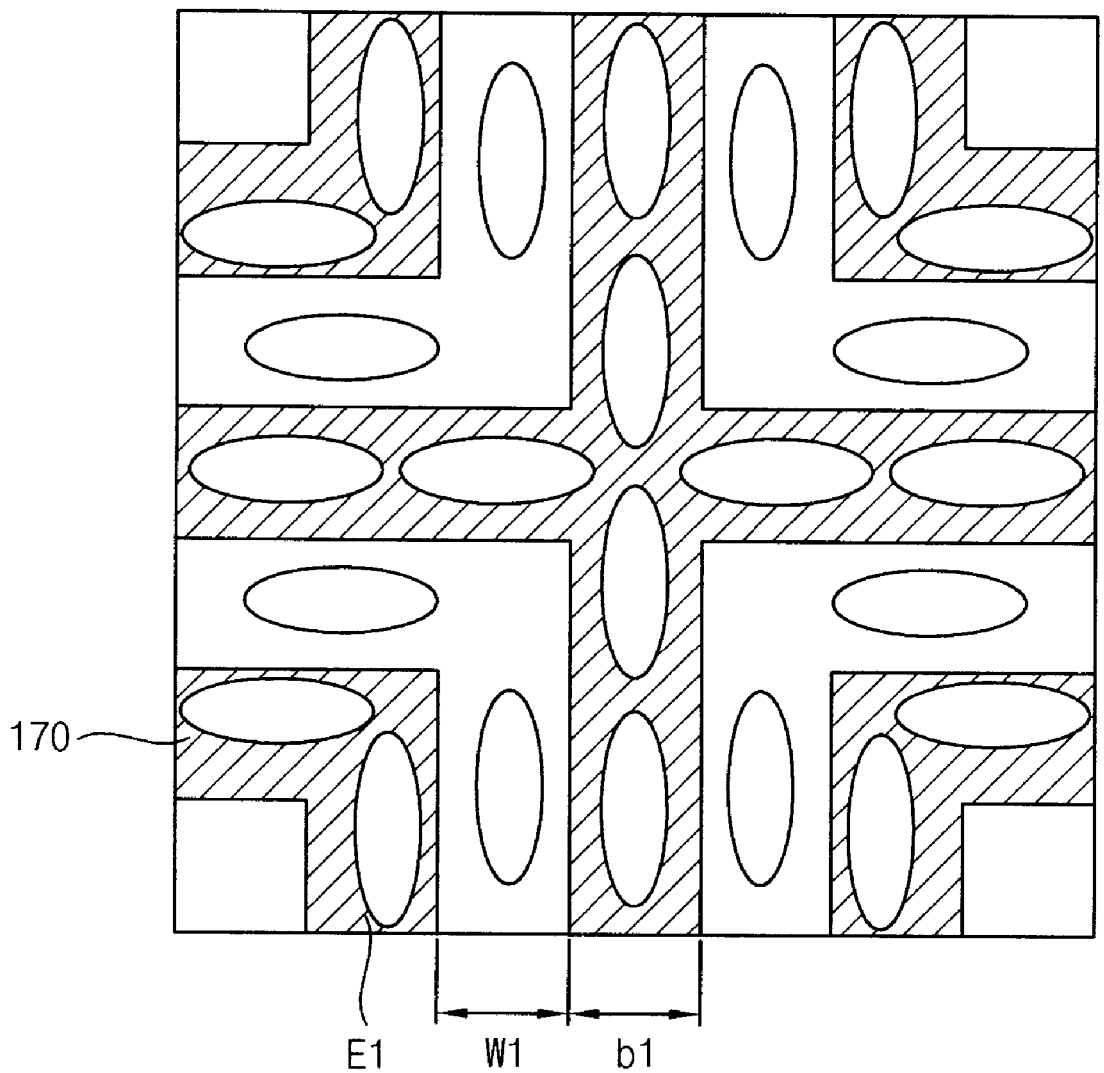
FIGS. 6A and 6B are top plan layout views illustrating a liquid crystal distribution of the exemplary embodiment of an LCD panel of FIG. 1 when an electric field is applied thereto.
Figure 6B:
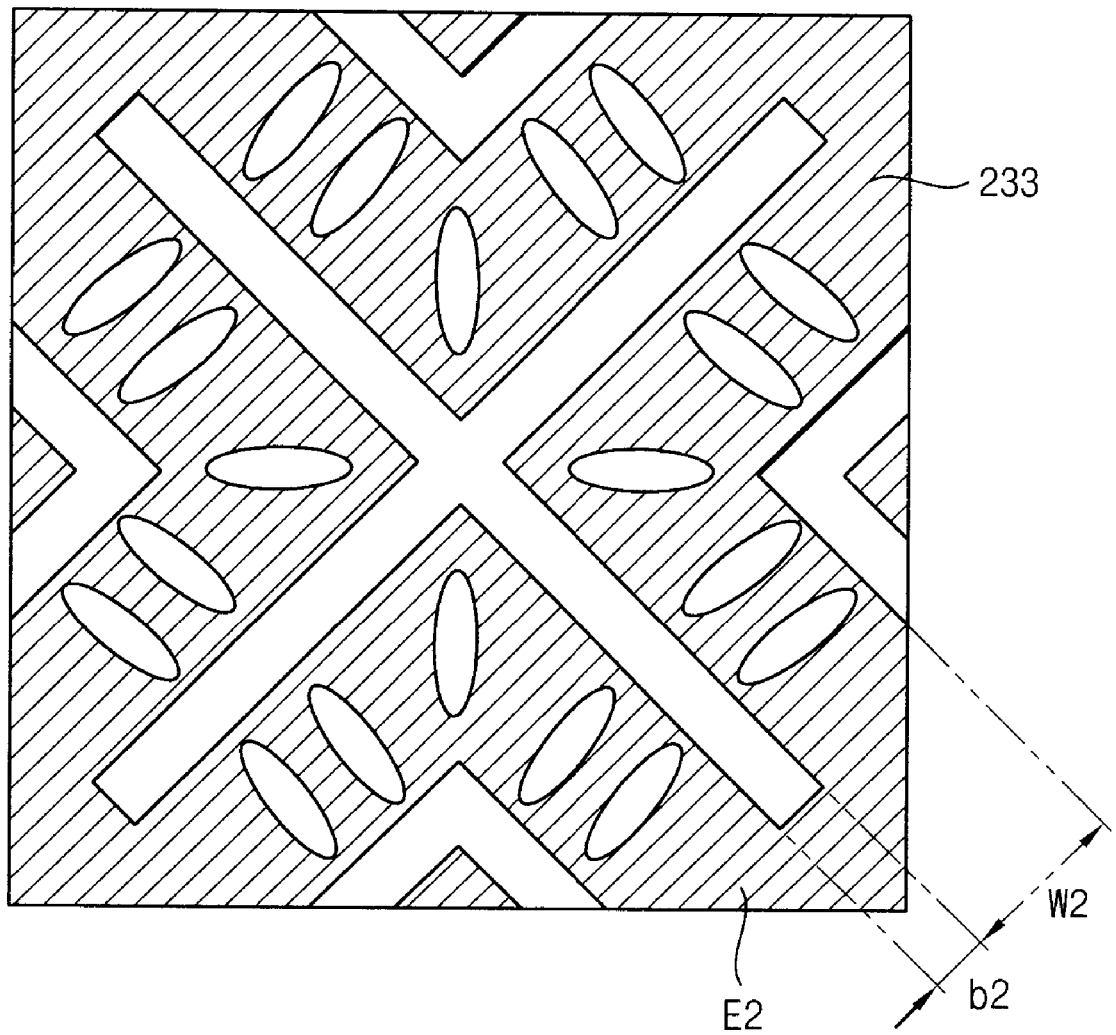

FIG. 4 is a cross-sectional view illustrating an exemplary embodiment of a liquid crystal distribution of the LCD panel of FIG. 1 when an electric field is not applied thereto. FIG. 5 is a cross-sectional view illustrating an exemplary embodiment of a liquid crystal distribution of the LCD panel of FIG. 1 when an electric field is applied thereto. FIGS. 6A and 6B are top plan layout views illustrating an exemplary embodiment of a liquid crystal distribution of the LCD panel of FIG. 1 when an electric field is applied thereto.

Referring to FIG. 4, when a voltage is not applied to a pixel electrode PE and a common electrode CE of the LCD panel, liquid crystals LC of the liquid crystal layer are vertically aligned.

Referring to FIGS. 5, 6A and 6B, when a voltage is applied to the pixel electrode PE and the common electrode CE, liquid crystals LC corresponding to the transmissive area TA are aligned along a long axis of the first slit electrode E1. Thus, a disclination line due to liquid crystal alignment defects is not generated in a middle area of a width W1 of the first slit electrode E1 and a distance b1 between the first slit electrodes E1, that is, an edge area of the first slit electrode E1, so that the LCD panel may have high transmissivity.

A width W2 of the second slit electrode E2 corresponding to the reflective area RA is wider than a distance b2 between the second slit electrodes E2, so that the liquid crystals LC are aligned to face with each other with respect to a distance b2 between the second slit electrodes E2. Thus, a wide viewing angle due to a dual domain effect may be realized.

Figure 7:
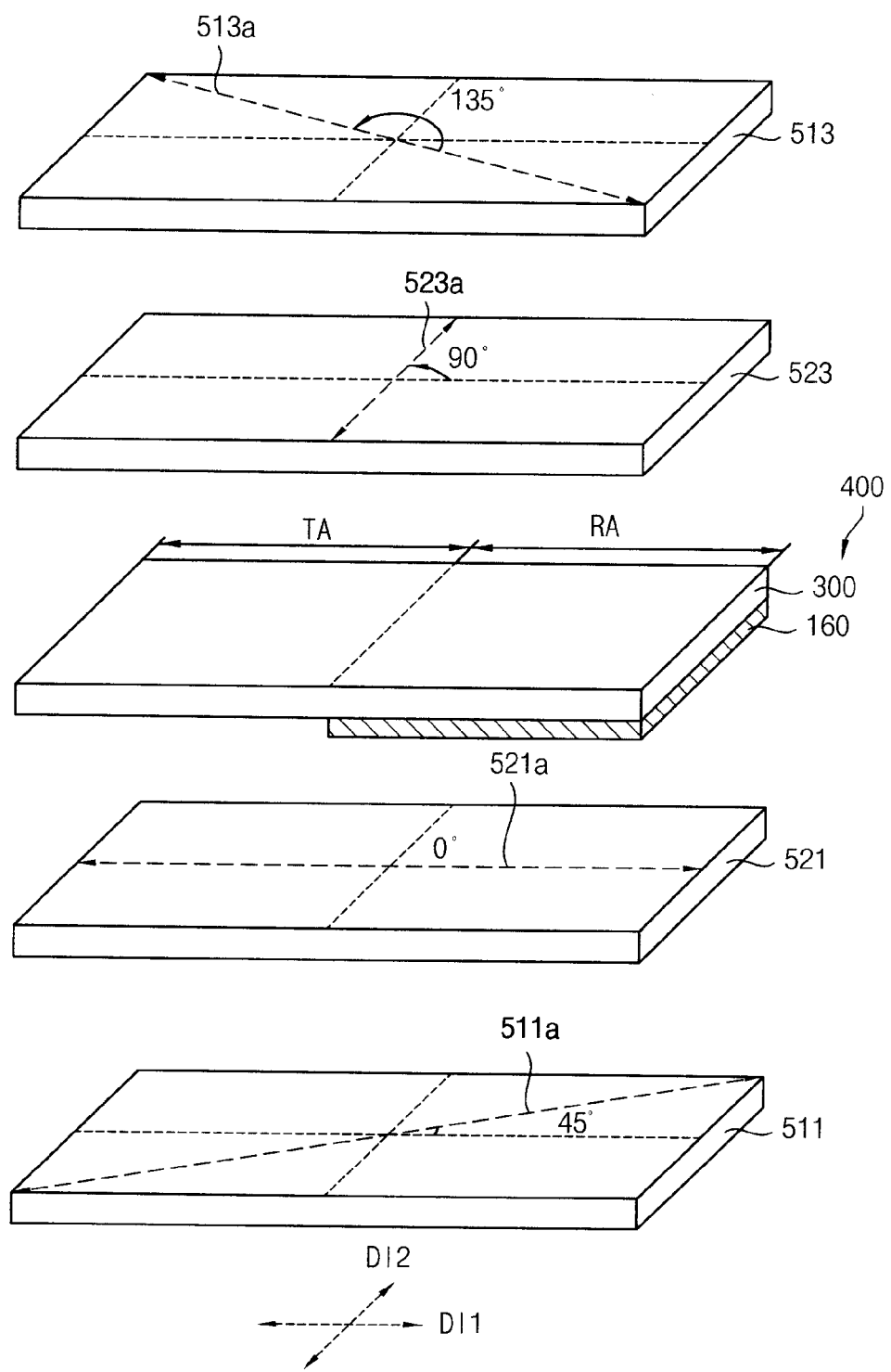
FIG. 7 is an exploded perspective view of an exemplary embodiment of a display assembly illustrating optical characteristics of the exemplary embodiment of an LCD panel of FIG. 1.

FIG. 7 is an exploded perspective view of an exemplary embodiment of a display assembly illustrating optical characteristics of the LCD panel of FIG. 1.

The display assembly includes the LCD panel 400, a polarizer 511, an analyzer 513, a lower ¼λ compensation film 521 and an upper ¼λ compensation film 523.

The polarizer 511 has a first transmitting axis 511a to be disposed below the liquid crystal layer 300. The analyzer 513 has a second transmitting axis 513a substantially perpendicular to the first transmitting axis 511a to be disposed on the liquid crystal layer 300. The lower ¼λ compensation film 521 is disposed between the liquid crystal layer 300 and the polarizer 511 to have a first optical axis 521a which is crossed with the first transmitting axis 511a. The upper ¼λ compensation film 523 is disposed between the liquid crystal layer 300 and the analyzer 513 to have a second optical axis 523a which is crossed with the second transmitting axis 513 a by about 45 degrees.

In one exemplary embodiment, a long axis of the first and second slit electrodes E1 and E2 may be substantially parallel with an extending direction (or a first direction DI1) of the gate line 111. Alternative exemplary embodiments include configurations wherein a long axis of the first and second electrode E1 and E2 may be parallel with an extending direction (or a second direction DI2) of the data line 141. That is, the long axis of the first and second slit electrodes E1 and E2 may be a horizontal direction (or a first direction DI1) or a vertical direction (or a second direction DI2). In exemplary embodiments wherein the lower and upper ¼λ compensation films 521 and 523 are omitted, a first transmitting axis 511a of the polarizer 511 and a second transmitting axis 513a of the analyzer 513 may be crossed with a long axis of the first and second slit electrodes E1 and E2, respectively, by about 45 degrees.

According to the present exemplary embodiment, the lower and upper ¼λ compensation films 521 and 523 having the first and second optical axises 521a and 523a respectively, which are crossed with the first and second transmitting axis 511a and 513a, are disposed so that light characteristics may be obtained even though transmitting axises of the polarizer 511 and the analyzer 513 that are perpendicular to the first and second slit electrodes E1 and E2 are optionally disposed.

Figure 8A:
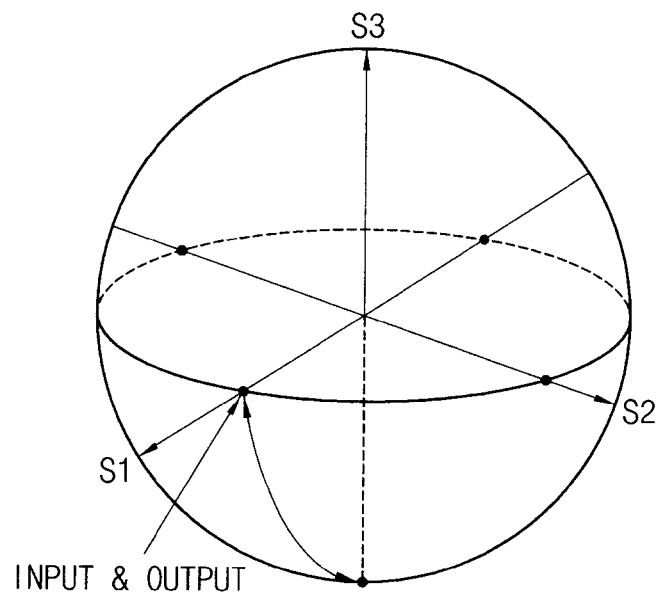
FIGS. 8A and 8B are Poincare spheres illustrating polarizing variations in a transmissive area of FIG. 1.
Figure 8B:
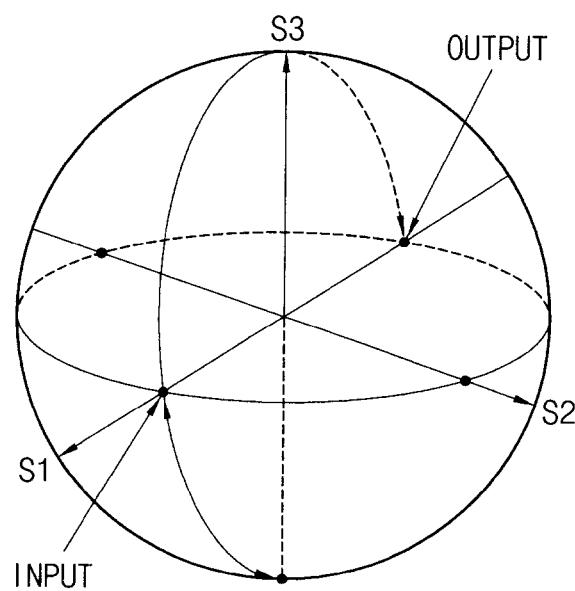

FIGS. 8A and 8B are Poincare spheres illustrating a polarizing variation in a transmissive area of FIG. 1.

Referring to FIGS. 7, 8A and 8B, when a voltage is not applied to the LCD panel 400, liquid crystal molecules are vertically aligned with respect to a surface of the LCD panel 400. Thus, light which transmits through the polarizer 511 passes the lower ¼λ compensation film 521 at an S1 axis to arrive at a lower vertex of a Poincare sphere. That is, light passes through the liquid crystal layer 300 without a polarizing variation, and then the light passes the upper ¼λ compensation film 523 to be again moved to the S1 axis. Therefore, light transmitting through the upper ¼λ compensation film 523 corresponds to an absorbing axis of the analyzer 513. Therefore, when a voltage is not applied, the display assembly displays black.

On the other hand, when a voltage is applied to the LCD panel 400, liquid crystal molecules are aligned substantially parallel with a surface of the LCD panel 400. Thus, light which transmits through the polarizer 511 is moved to an S3 axis by the liquid crystal layer 300 performing a role of a half wave film, and then the light is moved to an opposite side of the S1 axis by passing through the upper ¼λ compensation film 523. Therefore, light transmitting through the upper ¼λ compensation film 523 corresponds to a second transmitting axis 513a of the analyzer 513. Therefore the display assembly emits light, e.g., the display is white.

Figure 9A:
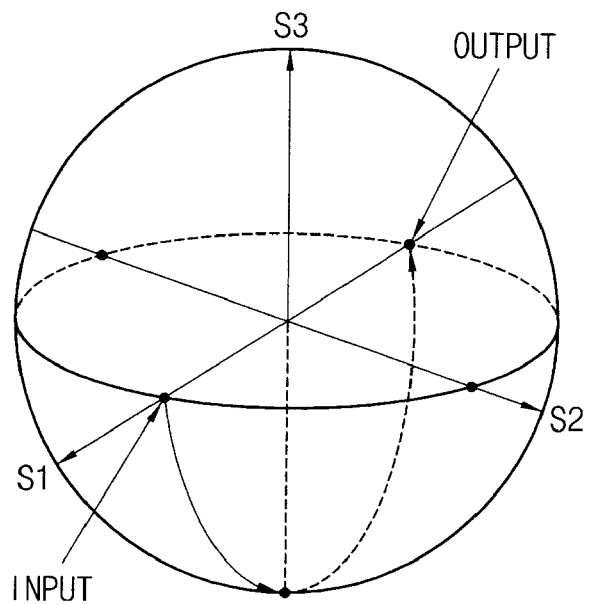
FIGS. 9A and 9B are Poincare spheres illustrating polarizing variation in a reflective area of FIG. 1.
Figure 9B:
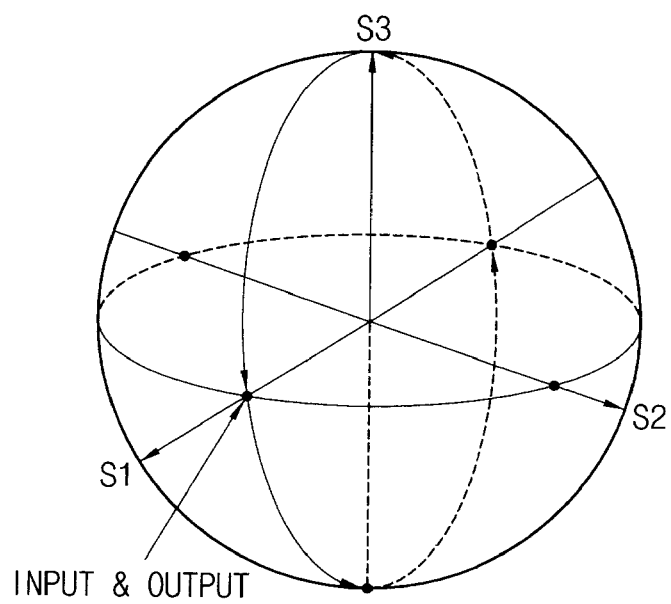

FIGS. 9A and 9B are Poincare spheres illustrating a polarizing variation in a reflective area of FIG. 1.

Referring to FIGS. 7, 9A and 9B, when a voltage is not applied to the LCD panel 400, light which transmits through the analyzer 513 is positioned at the S1 axis, and then the light is delayed by about 45 degrees passing through the upper ¼λ compensation film 523 to arrive at a lower vertex of a Poincare sphere. Then, light passes through the liquid crystal layer 300 to be reflected by a reflective electrode 160. The reflected light is again passed to the upper ¼λ compensation film 523 to be moved to an opposite side of the S1 axis. Therefore, light transmitting through the upper ¼λ compensation film 523 is corresponding to an absorbing axis of the analyzer 513. The display assembly displays black.

On the other hand, when a voltage is applied to the LCD panel 400, liquid crystal is aligned substantially in parallel with a surface of the LCD panel 400. Thus, light which transmits through the upper ¼λ compensation film 523 is moved to an opposite side of an S1 axis by the liquid crystal layer 300 performing a role of a half wave film, and then the reflected light by the reflective electrode 160 is again passed to the liquid crystal layer 300 to be moved to an upper vertex of a Poincare sphere. Then, the light passes the upper ¼λ compensation film 523 to be moved to the S1 axis. Therefore, light transmitting through the upper ¼λ compensation film 523 is corresponding to a second transmitting axis 513a of the analyzer 513. The display assembly emits light, e.g., the display is white.

Figure 10:
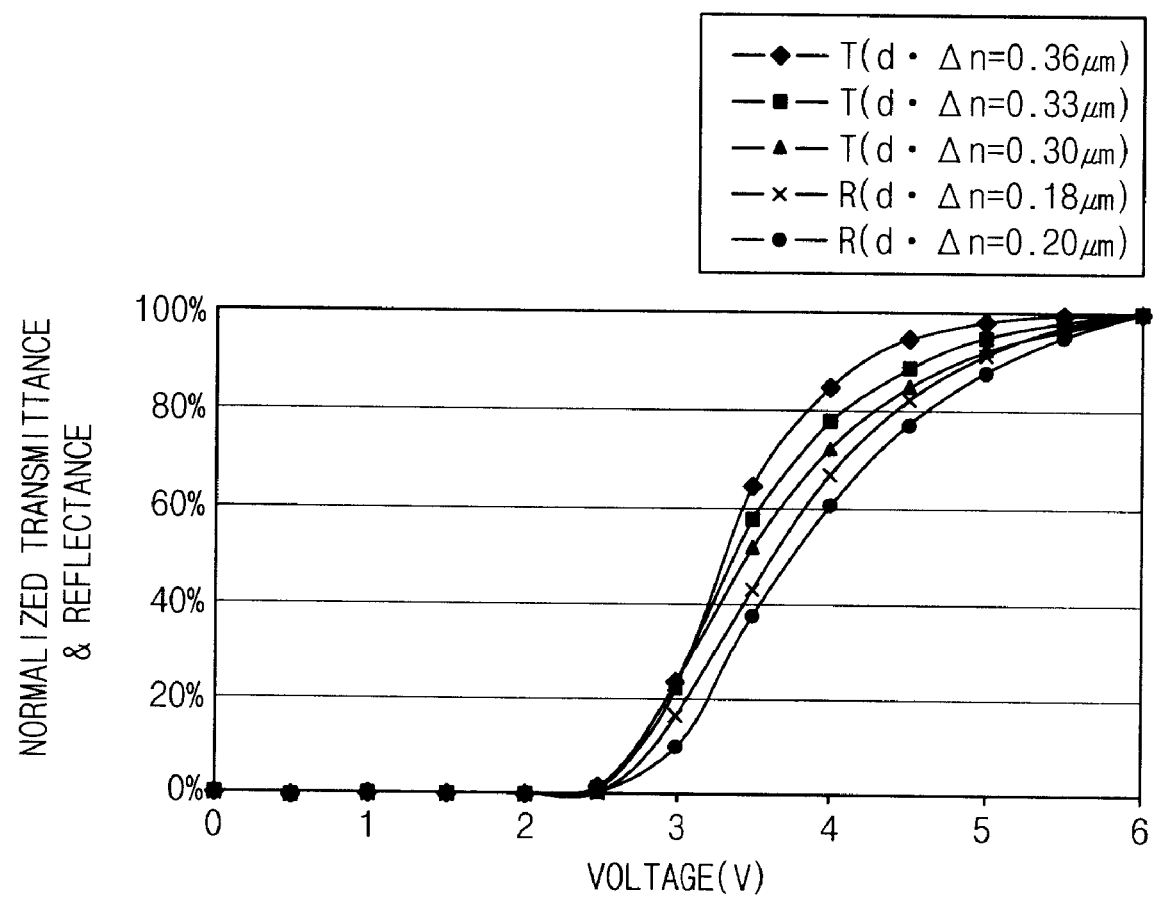
FIG. 10 is a graph illustrating V-T curve and V-R curves of the exemplary embodiment of an LCD panel.

FIG. 10 is a graph illustrating V-T curve and V-R curve of the LCD panel having various physical characteristics.

Referring to FIGS. 1 and 10, a width W1 of the first slit electrode E1 disposed in the transmissive area TA and a distance b1 between the first slit electrodes E1 are 4 μm and 2 μm, respectively, and a phase delay (or a retardation value) (d·Δn) of liquid crystal is varied from 0.36 μm, 0.33 μm and 0.30 μm, wherein d is the cell gap and Δn is the average birefringence of the liquid crystal within the cell gap. A width W2 of the second slit electrode E2 disposed in the reflective area RA and a distance b2 between the second slit electrodes E2 are 15 μm and 2 μm, respectively, and a phase delay (d·Δn) of liquid crystal is classified as 0.18 μm and 0.20 μm.

As shown in the graph of FIG. 10, it is recognized that a threshold voltage corresponding to the transmissive area TA is substantially equal to that of the reflective area RA. Moreover, it is recognized that a transmittance versus applied voltage curve (V-T curve) and a reflectivity versus applied voltage curve (V-R curve) are substantially matched at the transmissive area TA of which a phase delay is about 0.30 μm and 0.18 μm. In other words, the transmittance and the reflectance are most evenly matched when the phase delay (or retardation value) of the transmissive area is about 0.30 μm and the phase delay (or retardation value) of the reflective area is about 0.18 μm.

Exemplary Embodiment 2

Figure 11:
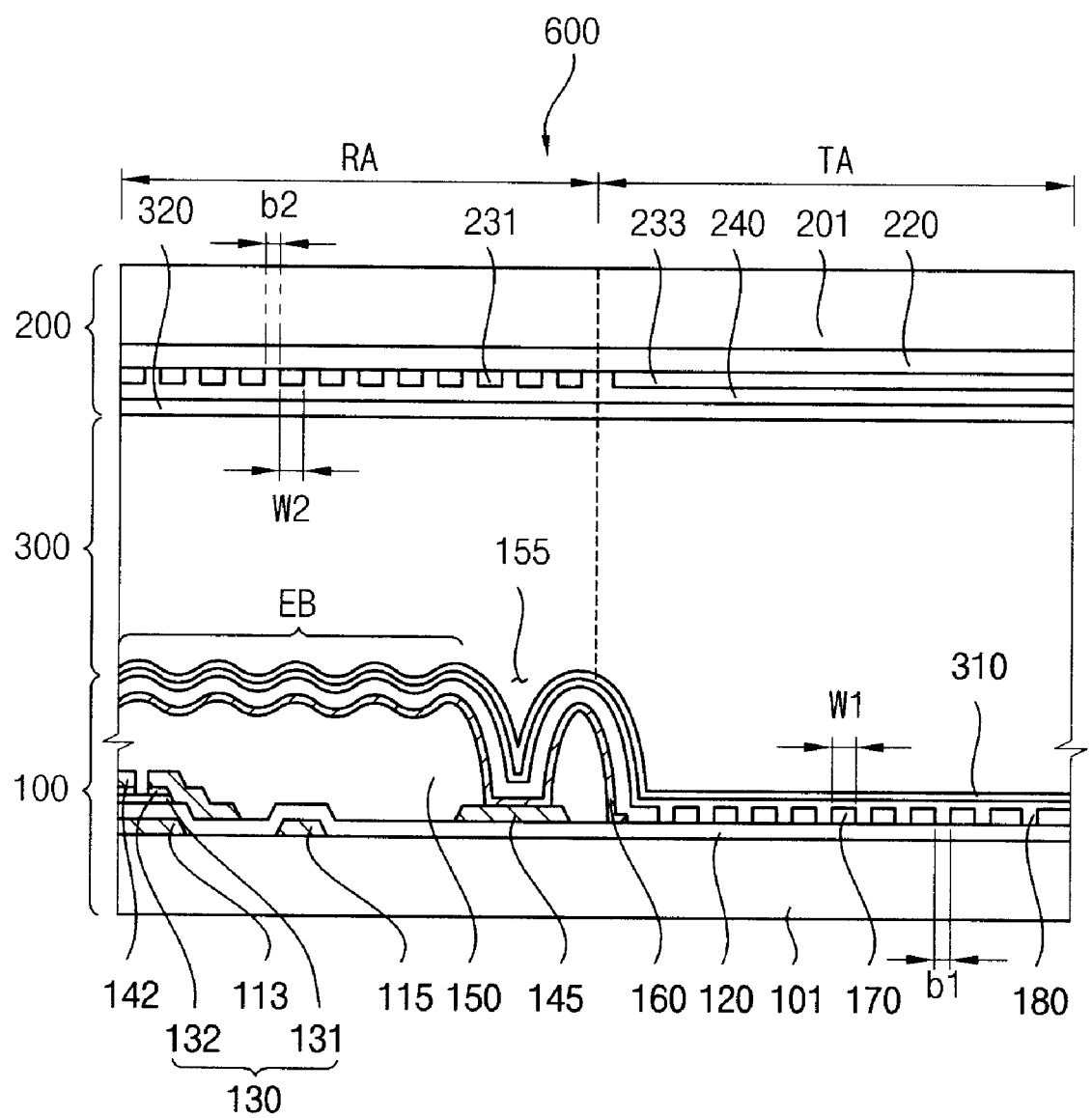
FIG. 11 is a cross-sectional view of an exemplary embodiment of an LCD panel according to a second exemplary embodiment of the present invention.
Figure 12A:
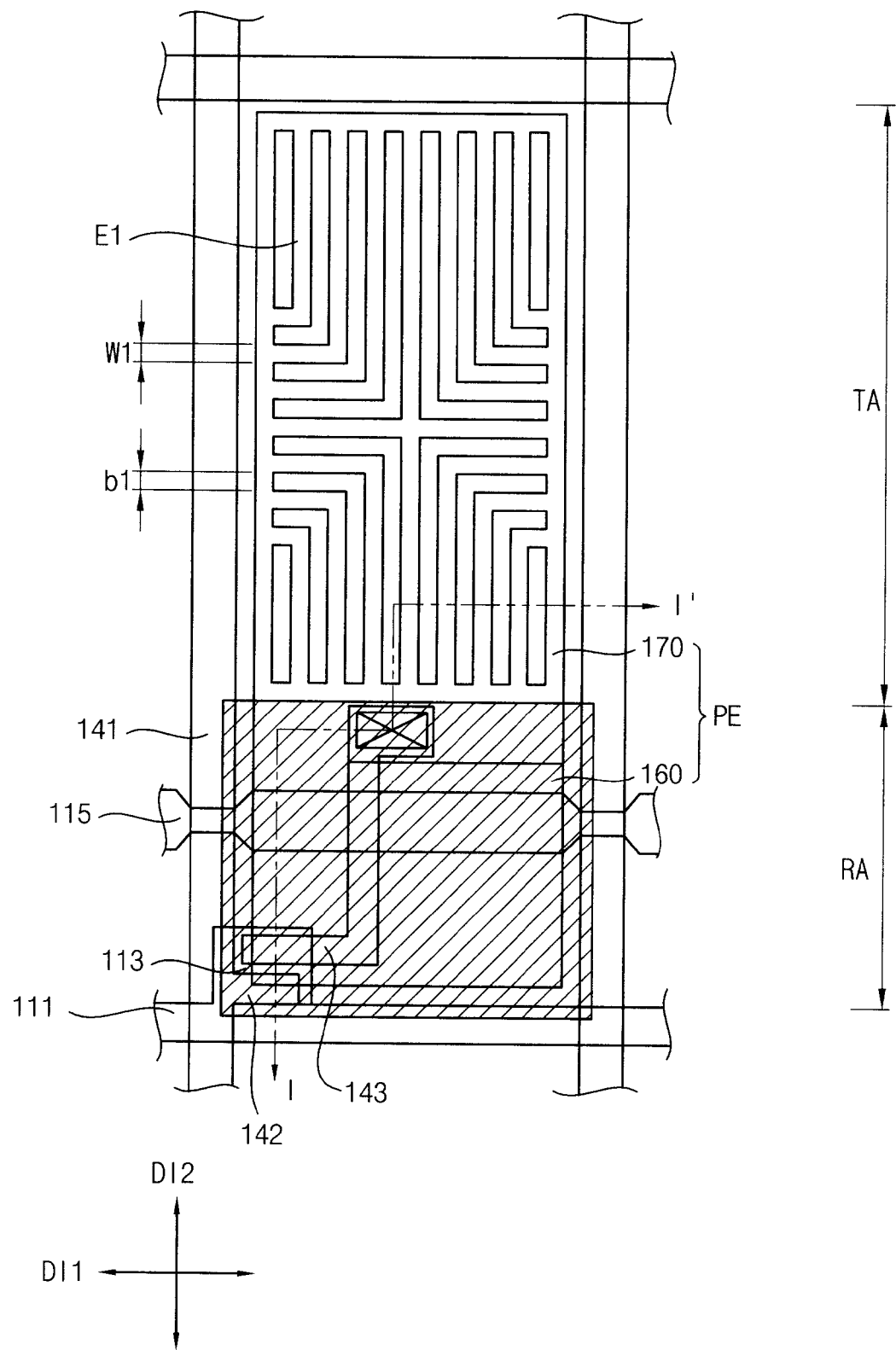
FIG. 12A is a top plan layout view illustrating an exemplary embodiment of an array substrate of FIG. 11.
Figure 12B:
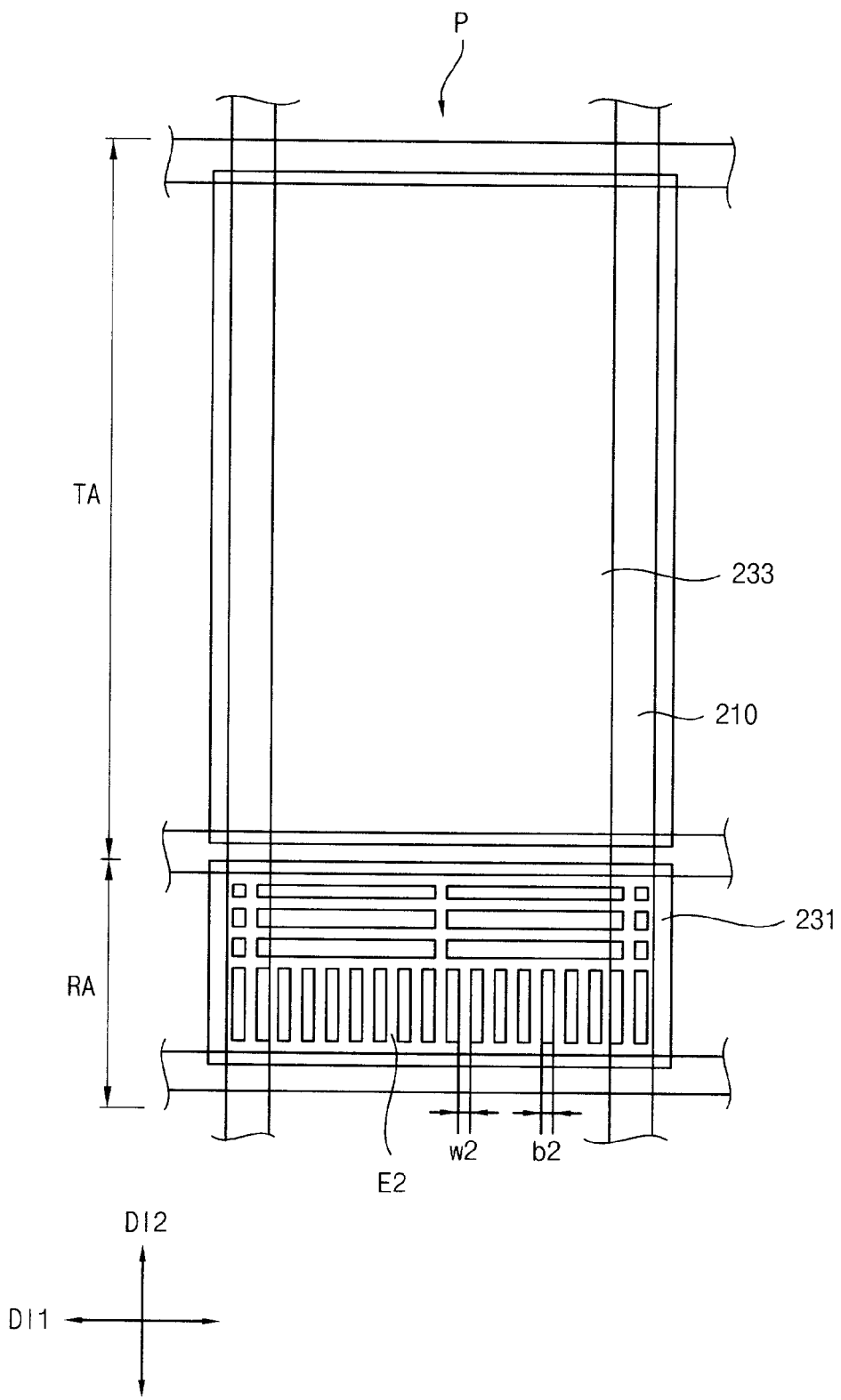
FIG. 12B is a top plan layout view illustrating an exemplary embodiment of an opposite substrate of FIG. 11.

FIG. 11 is a cross-sectional view of a second exemplary embodiment of an LCD panel according to the present invention. FIG. 12A is a top plan layout view illustrating an array substrate of FIG. 11. FIG. 12B is a top plan layout view illustrating an opposite substrate of FIG. 11. The LCD panels of the second exemplary embodiment is substantially the same as the LCD panels of the first exemplary embodiment except for at least a first common electrode disposed in a reflective area. Thus, the same reference numerals are used in FIG. 11 to refer to components that are the same or like those shown in the LCD panel of the first exemplary embodiment, and thus, a detailed description thereof will be omitted.

Referring to FIGS. 11, 12A and 12B, the LCD panel 600 includes an array substrate 100, an opposite substrate 200 and a liquid crystal layer 300.

The array substrate 100 includes the reflective electrode 160 disposed in the reflective area RA and the transparent electrode 170 covering the reflective electrode 160 to be disposed on the transmissive area TA. In the present exemplary embodiment, the transparent electrode 170 is disposed to cover the reflective electrode 160, so that an etching solution for etching the transparent electrode 170 may prevent the reflective electrode 160 from being damaged. Alternatively, the transparent electrode 170 may be formed in the transparent area TA to be overlapped with a portion of the reflective electrode 160 as shown in the LCD panel 400 of the first exemplary embodiment.

The opposite substrate 200 includes a first common electrode 231 disposed in the reflective area RA and a second common electrode 233 disposed in the transmissive area TA. The first common electrode 231 includes a plurality of slit electrodes E2. In one exemplary embodiment, a width W2 of each second slit electrode E2 may be no more than about 10 μm, and a distance b2 between the second slit electrodes E2 may be no more than about 10 μm. In one exemplary embodiment, when the width W1 of the first slit electrode E1 is bout 1 μm, the width W2 of the second slit electrode E2 may be about 0.5 μm to about 2 μm. In the present exemplary embodiment, the second slit electrodes E2 are extended in at least two directions to define a plurality of domains. In the present exemplary embodiment, the second common electrode 233 is spaced apart from the first common electrode 231 to be formed on the transmissive area TA in a planar structure.

The liquid crystal layer 300 includes a first hardened layer 310 and a second hardened layer 320, exemplary embodiments of which may be formed from a reactive mesogenic monomer. In one exemplary embodiment, the first hardened layer 310 corresponding to the reflective area RA has a first pretilt angle, and the second hardened layer 320 corresponding to the transmissive area TA has a second pretilt angle. The second hardened layer 320 corresponding to the reflective area RA has a third pretilt angle, and the second hardened layer 320 corresponding to the transmissive area TA has a fourth pretilt angle. Thus, the pretilt angles of the reflective area RA and the transmissive area TA are effectively controlled using the reactive mesogenic monomer, so that a V-R curve and a V-T curve may be obtained.

An exemplary embodiment of a manufacturing method of the second exemplary embodiment of an LCD panel 600 is substantially the same as a manufacturing method of the first exemplary embodiment of an LCD panel 400, which is described referring to FIG. 3. Thus, a detailed description thereof will be omitted.

Figure 13:
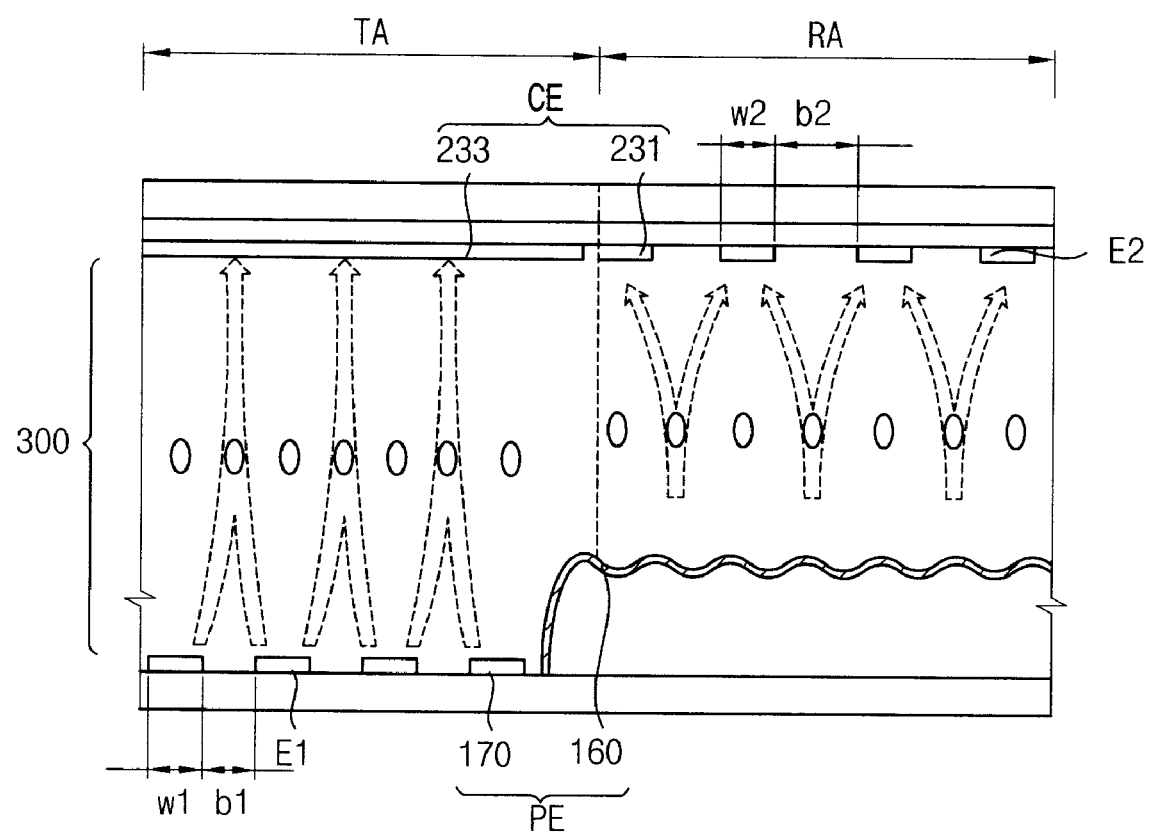
FIG. 13 is a cross-sectional view illustrating an exemplary embodiment of a liquid crystal distribution of the exemplary embodiment of an LCD panel of FIG. 11 when an electric field is applied thereto.
Figure 14A:
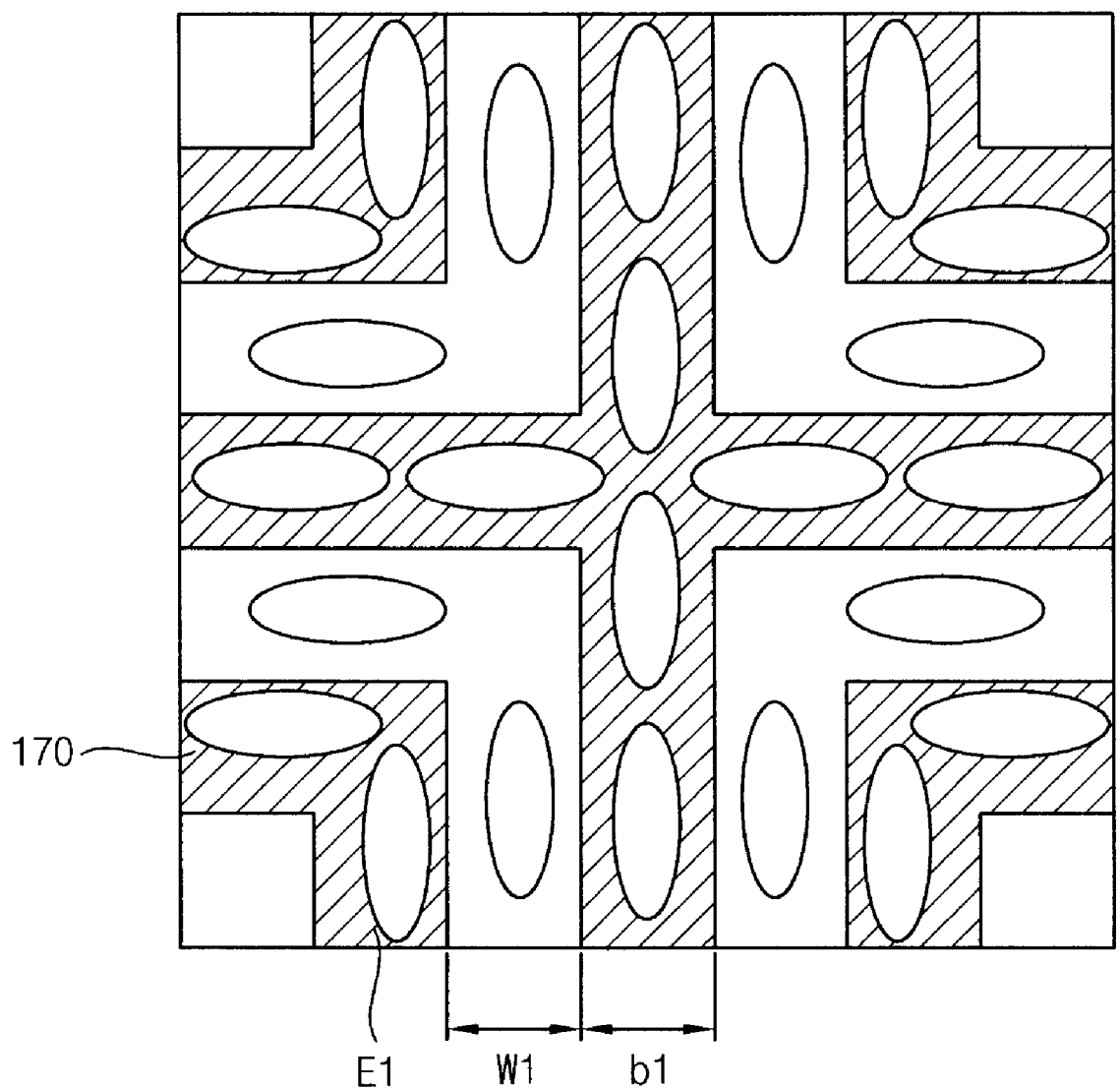
FIGS. 14A and 14B are top plan layout views illustrating a liquid crystal distribution of the exemplary embodiment of an LCD panel of FIG. 11 when an electric field is applied thereto.
Figure 14B:
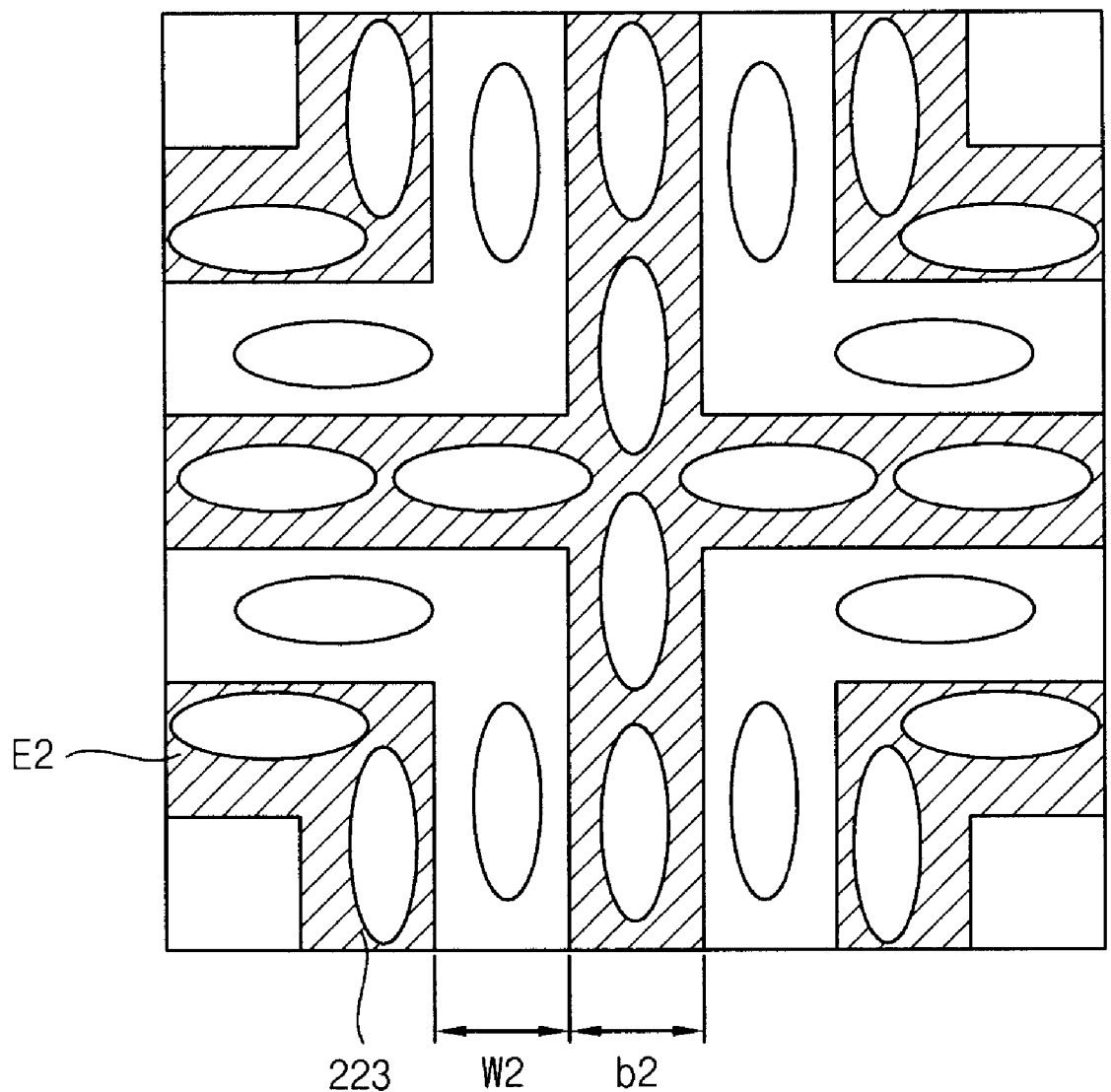

FIG. 13 is a cross-sectional view illustrating an exemplary embodiment of a liquid crystal distribution of the second exemplary embodiment of an LCD panel of FIG. 11 when an electric field is applied thereto. FIGS. 14A and 14B are top plan layout views illustrating a liquid crystal distribution of the exemplary embodiment of an LCD panel of FIG. 11 when an electric field is applied thereto.

Referring to FIGS. 13, 14A and 14B, when a voltage is applied to the pixel electrode PE and the common electrode CE, liquid crystals LC corresponding to the transmissive area TA are aligned in a long axis of the first slit electrode E1. Thus, a disclination line due to liquid crystal alignment defects is not generated in a middle area of a width W1 of the first slit electrode E1 and a distance b1 between the first slit electrodes E1, that is, an edge area of the first slit electrode E1, so that the LCD panel may have high transmissivity.

Moreover, liquid crystals LC corresponding to the reflective area RA are aligned along a long axis direction of the second slit electrode E2 having a width W2 and a distance b2 that are substantially equal to a width W1 and a distance b1 of the first slit electrode E1, respectively, so that the LCD panel may have high reflectivity.

Exemplary Embodiment 3

FIG. 15 is a cross-sectional view of a third exemplary embodiment of an LCD panel according the present invention. The third exemplary embodiment of an LCD panel is substantially similar to the previous exemplary embodiments of LCD panels except for at least a common electrode disposed on the opposite substrate and a pixel electrode disposed on the array substrate. Thus, identical reference numerals are used in FIG. 15 to refer to components that are the same or similar to those shown in the first exemplary embodiment of an LCD panel, and thus, a detailed description thereof will be omitted.

The LCD panel 700 includes an array substrate 100, an opposite substrate 200 and a liquid crystal layer 300. The array substrate 100 includes a pixel electrode PE, and the pixel electrode PE includes a reflective electrode 160 disposed on the reflective area RA and a transparent electrode 170 disposed on the transmissive area TA. In the present exemplary embodiment, the reflective electrode 160 and the transparent electrode 170 may have a planar structure.

The opposite substrate 200 includes a common electrode CE, and the common electrode CE includes a first common electrode 231 disposed on the reflective area RA and a second common electrode 233 disposed on the transmissive area TA. The first common electrode 231 includes a plurality of first slit electrodes E1, and the second common electrode 233 includes a plurality of second slit electrodes E2.

In the present exemplary embodiment, a width W1 of the first slit electrode E1 is no more than about 10 μm, and a distance b1 between the first slit electrodes E1 is no more than about 10 μm. Also in the present exemplary embodiment, each of a width W2 and a distance b2 of the second slit electrode E2 is no more than about 10 μm.

When a voltage is applied to the pixel electrode PE and the common electrode CE, liquid crystals LC corresponding to the transmissive area TA and the reflective area RA are aligned in a long axis direction of the first and second slit electrodes E1 and E2. Thus, a disclination line due to liquid crystal alignment defects is not generated in a middle area of a width W1 of the first slit electrode E1 and a distance b1 between the first slit electrodes E1, that is, an edge area of the first slit electrode E1, and a middle area of a width W2 of the second slit electrode E2 and a distance b2 between the second slit electrodes E2, that is, an edge area of the second slit electrode E2, so that the LCD panel may have high transmissivity and high reflectivity.

The liquid crystal layer 300 includes a first hardened layer 310 and a second hardened layer 320, exemplary embodiments of which may be formed from a reactive mesogenic monomer. In the present exemplary embodiment, the first hardened layer 310 corresponding to the reflective area RA has a first pretilt angle, and the first hardened layer 310 corresponding to the transmissive area TA has a second pretilt angle. Also in the present exemplary embodiment, the second hardened layer 320 has a third pretilt angle, and the second hardened layer 320 corresponding to the transmissive area TA has a fourth pretilt angle.

Therefore, pretilt angles of the reflective area RA and the transmissive area TA are effectively controlled using the reactive mesogenic monomer, so that V-R curve characteristics and V-T curve characteristics may be obtained.

An exemplary embodiment of a manufacturing method of the third exemplary embodiment of an LCD panel 700 is substantially similar to a manufacturing method of the first exemplary embodiment of an LCD panel 400 which is described referring to FIG. 3. Thus, a detailed description thereof will be omitted.

Exemplary Embodiment 4

Figure 16:
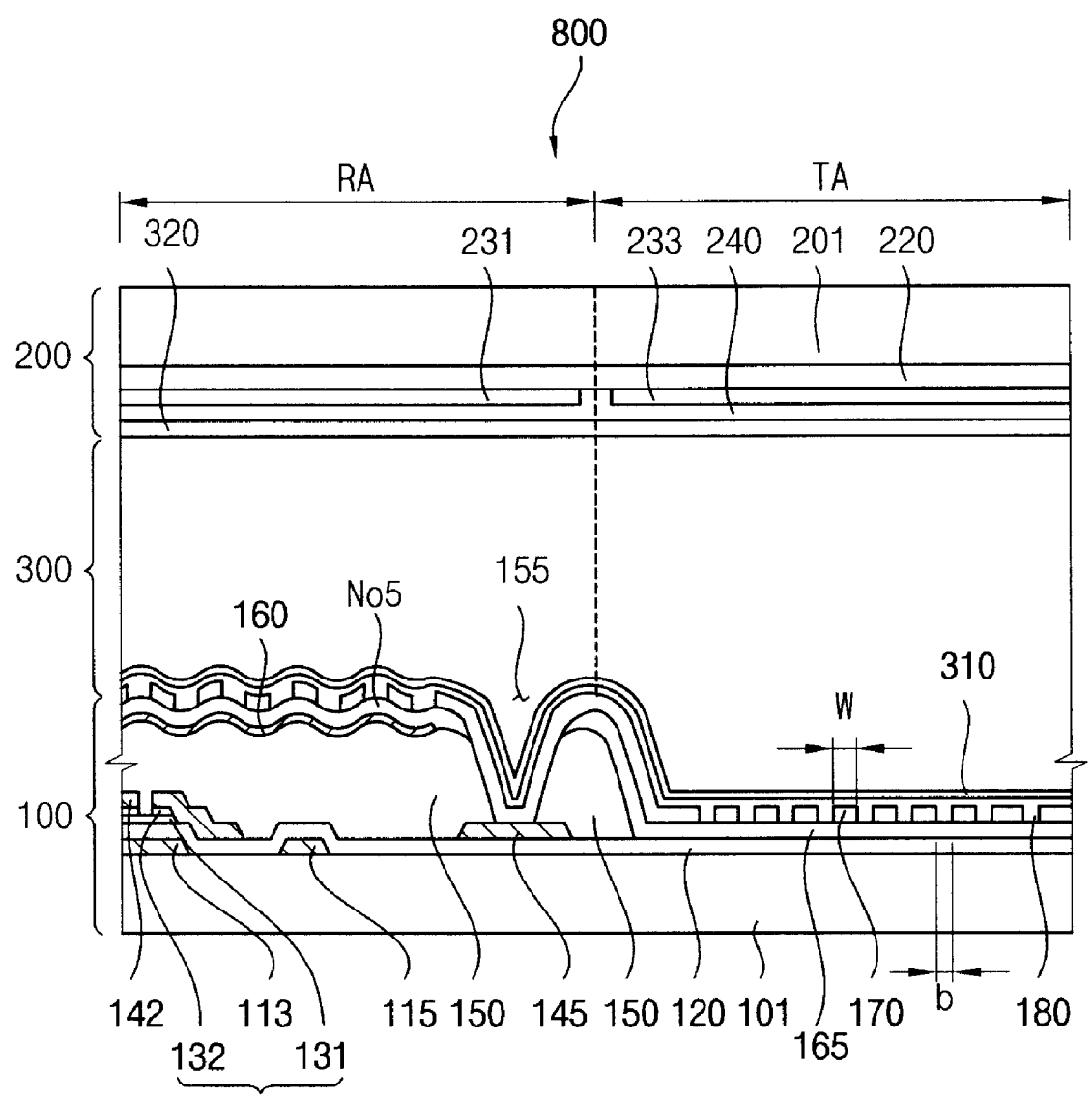
FIG. 16 is a cross-sectional view of an exemplary embodiment of an LCD panel according to a fourth exemplary embodiment of the present invention.
Figure 17A:
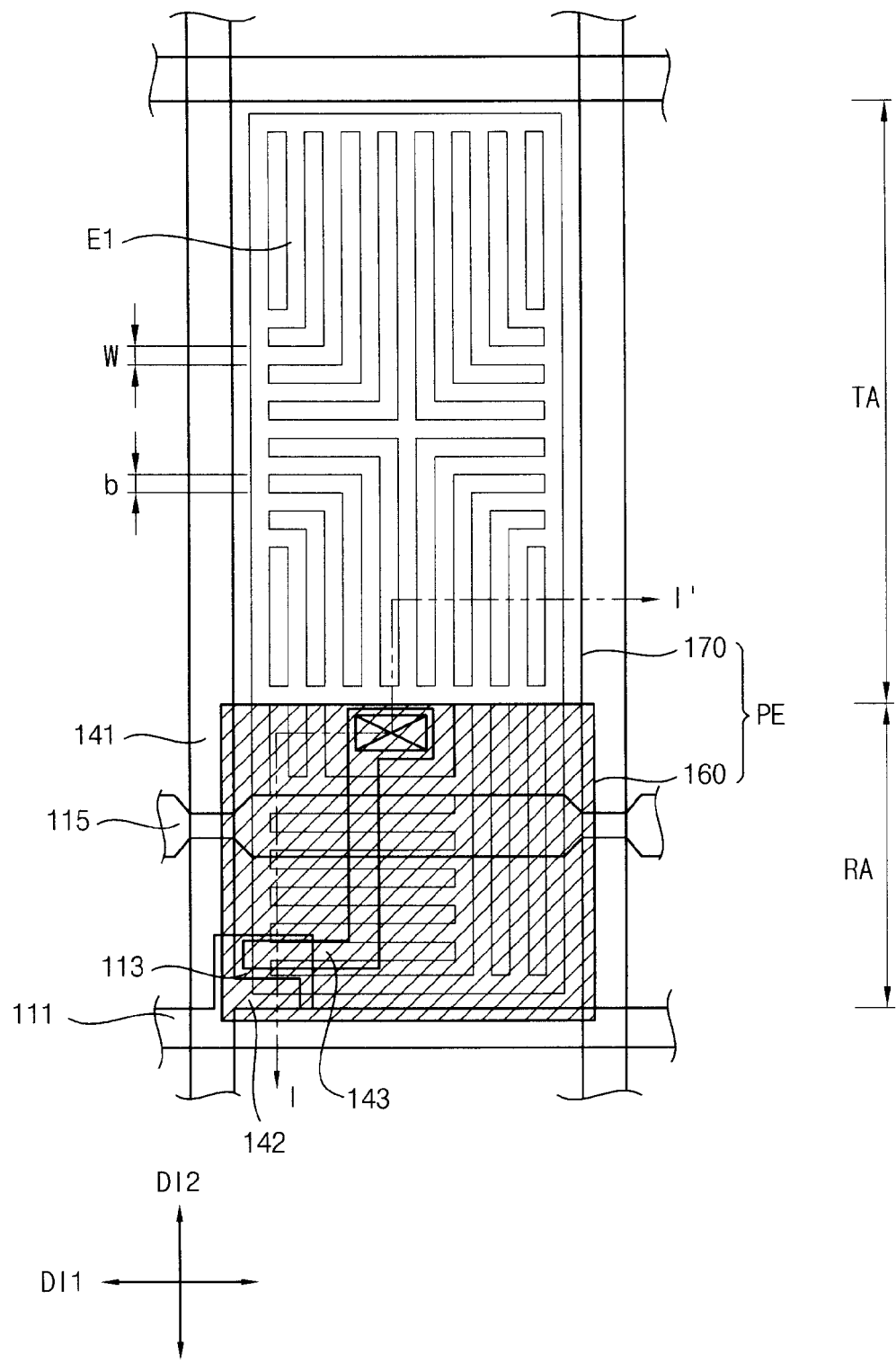
FIG. 17A is a top plan layout view illustrating an exemplary embodiment of an array substrate of FIG. 16.
Figure 17B:
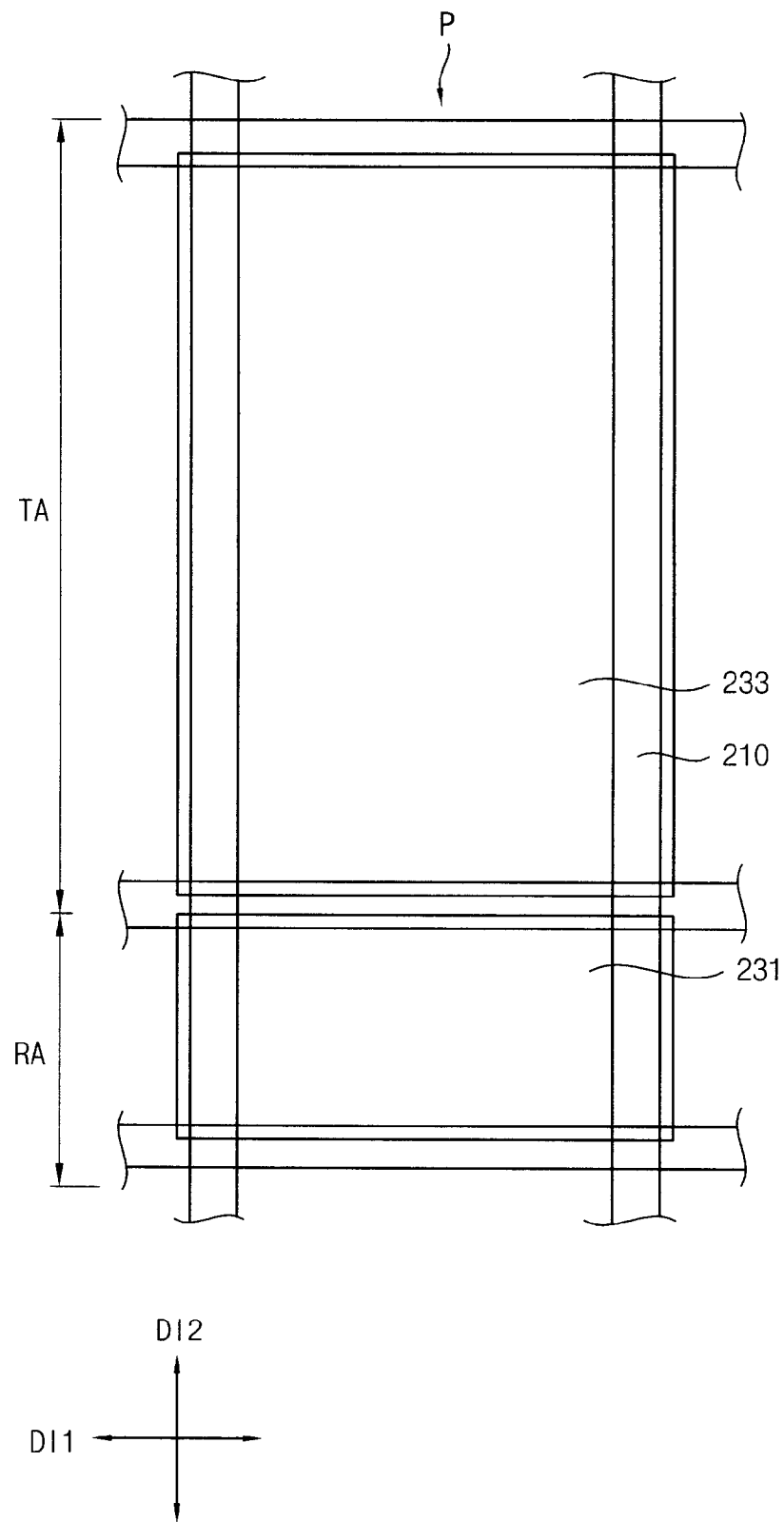
FIG. 17B is a top plan layout view illustrating an exemplary embodiment of an opposite substrate of FIG. 16.

FIG. 16 is a cross-sectional view of a fourth exemplary embodiment of an LCD panel according to the present invention. FIG. 17A is a top plan layout view illustrating an array substrate of FIG. 16. FIG. 17B is a top plan layout view illustrating an opposite substrate of FIG. 16. Hereafter, the same reference numerals will be used to refer to the same or like parts as in the previous exemplary embodiments, and any further explanation concerning the above elements will be omitted.

The LCD panel 800 includes an array substrate 100, an opposite substrate 200 and a liquid crystal layer 300.

The array substrate 100 includes a first base substrate 101, a gate line 111, a storage line 115, a gate insulation layer 120, a data line 141, a switching element TR, an organic layer 150, a reflective electrode 160, an insulation layer 165, a transparent electrode 170 and a first alignment layer 180.

The reflective electrode 160 is disposed on the organic layer 150. In one exemplary embodiment, the reflective electrode 160 may be electrically isolated from the switching element TR. When the reflective electrode 160 is expanded to an adjacent pixel area along the gate line 111, a peripheral area of the pixel area 'P' may be utilized as a reflective area. Thus, as the reflective area is increased, the LCD panel may have high reflecting characteristic.

The insulation layer 165 is disposed on the first base substrate 101 having the reflective electrode 160 disposed thereon to cover the reflective electrode 160. That is, the insulation layer 165 is disposed between the reflective electrode 160 and the transparent electrode 170, and is disposed between the gate insulation layer 120 and the transparent electrode 170 in an area corresponding with the transmissive area TA.

The transparent electrode 170 is formed on a pixel area 'P' including the transmissive area TA and the reflective area RA. The transparent electrode 170 is a pixel electrode formed on the pixel area 'P'. The transparent electrode 170 is electrically connected to the switching element TR through the contact hole 155. In one exemplary embodiment, the contract hole 155 may be formed by simultaneously etching the organic layer 150 and the insulation layer 165.

The transparent electrode 170 includes a plurality of slit electrodes E1. In one exemplary embodiment, a width 'w' of the slit electrodes E1 and a distance 'b' between the slit electrodes E1 may be no more than about 10 μm.

In one exemplary embodiment, a long axis direction of the slit electrode E1 may be a unit direction. Alternative exemplary embodiments include configurations wherein the long axis direction of the slit electrode E1 has at least two directions, so that a viewing angle may be increased. In the transmissive area TA, an electric field may be formed by the transparent electrode 170 having the slit electrode E1 and a second common electrode 233 having a planar structure.

In the reflective area RA, the transparent electrode 170 having a plurality of slit electrodes E1 is positioned between the reflective electrode 160 and the first common electrodes 231 having a planar structure, so that an effective fringe field is generated. Thus, when an electric field is applied in the reflective area RA, liquid crystal molecules which are arranged in a vertical direction are aligned uniformly, so that reflectivity of the LCD panel may be enhanced.

In addition, in the reflective area RA, the reflective electrode 160 having a planar structure is used as a counter electrode of the transparent electrode 170, so that the reflective electrode 160 is extended to an adjacent pixel area along the gate line 111 so that a peripheral area of the pixel area P may be utilized as a reflective area. Thus, as the reflective area is wider, the LCD panel may have high reflectivity.

Additionally, as the storage line 115 is disposed in the reflective area RA substantially parallel with the gate line 111, a decreasing of an aperture ratio due to the storage line 115 formed from a nontransparent metal material may be prevented. In one exemplary embodiment, the storage line 115 includes a nontransparent metal material, so that a resistance thereof may be small. Also, in the present exemplary embodiment the storage line 115 has a planar structure, so that the storage line 115 and the upper slit electrodes E1 may form a storage capacitor having a sufficient capacitance.

Moreover, the contact hole 155 is disposed in a boundary area between the reflective area RA and the transmissive area TA, so that a loss of an aperture ratio may be minimized.

The opposite substrate 200 includes a first common electrode 231 disposed on the reflective area RA and a second common electrode 233 disposed on the transmissive area TA. In one exemplary embodiment, the first and second common electrodes 231 and 233 may have a planar structure to be spaced apart from each other.

The liquid crystal layer 300 includes a first hardened layer 310 and a second hardened layer 320, exemplary embodiments of which may be formed from a reactive mesogenic monomer. In one exemplary embodiment, the first hardened layer 310 corresponding to the reflective area RA has a first pretilt angle, and the second hardened layer 320 corresponding to the transmissive area TA has a second pretilt angle. In one exemplary embodiment, the second hardened layer 320 corresponding to the reflective area RA has a third pretilt angle, and the second hardened layer 320 corresponding to the transmissive area TA has a fourth pretilt angle.

Thus, the pretilt angles of the reflective area RA and the transmissive area TA are effectively controlled using the reactive mesogenic monomer, so that a V-R curve and a V-T curve may be obtained.

An exemplary embodiment of a manufacturing method of the fourth exemplary embodiment of an LCD panel 800 is substantially the same as an exemplary embodiment of a manufacturing method of the previous exemplary embodiment of an LCD panel 400 which is described referring to FIG. 3. Thus, a detailed description thereof will be omitted.

Figure 18:
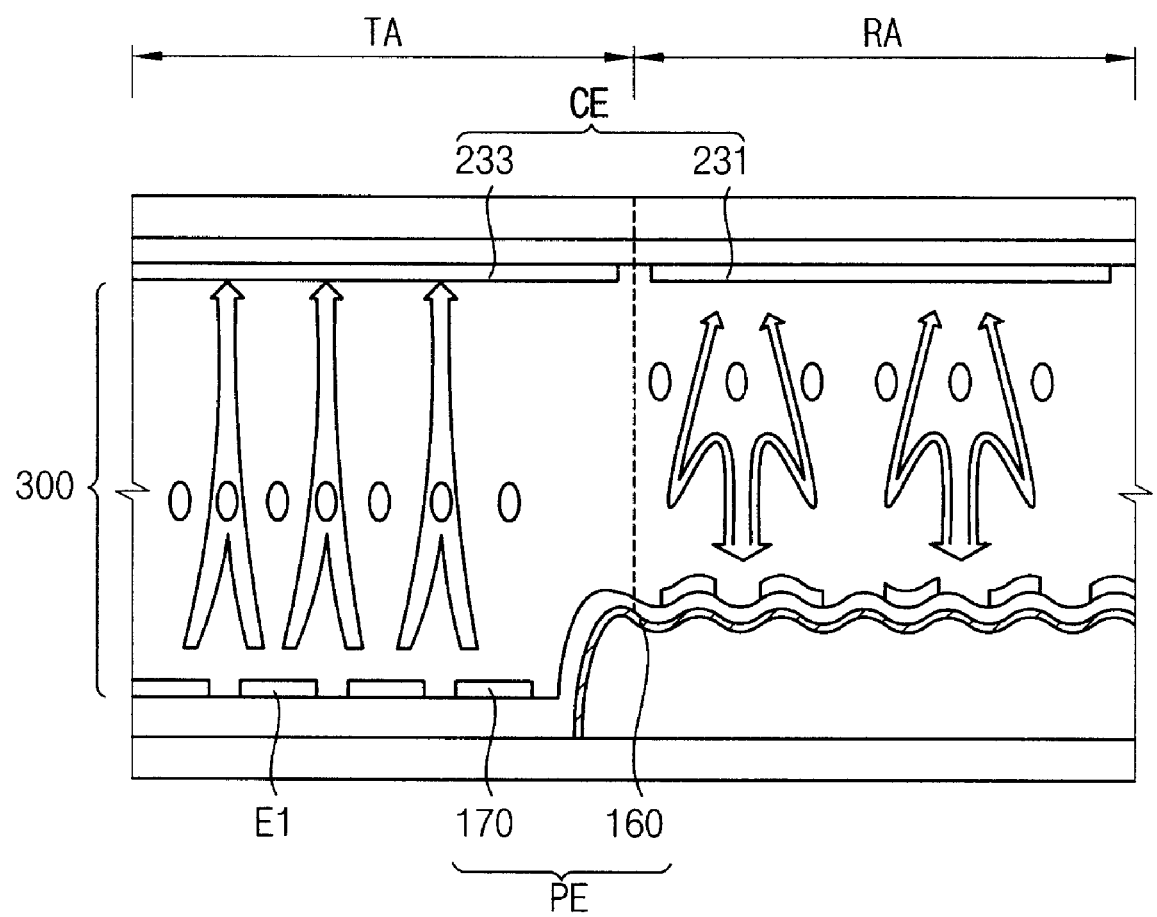
FIG. 18 is a cross-sectional view illustrating an exemplary embodiment of a liquid crystal distribution of the exemplary embodiment of an LCD panel of FIG. 16 when an electric field is applied thereto.
Figure 19A:
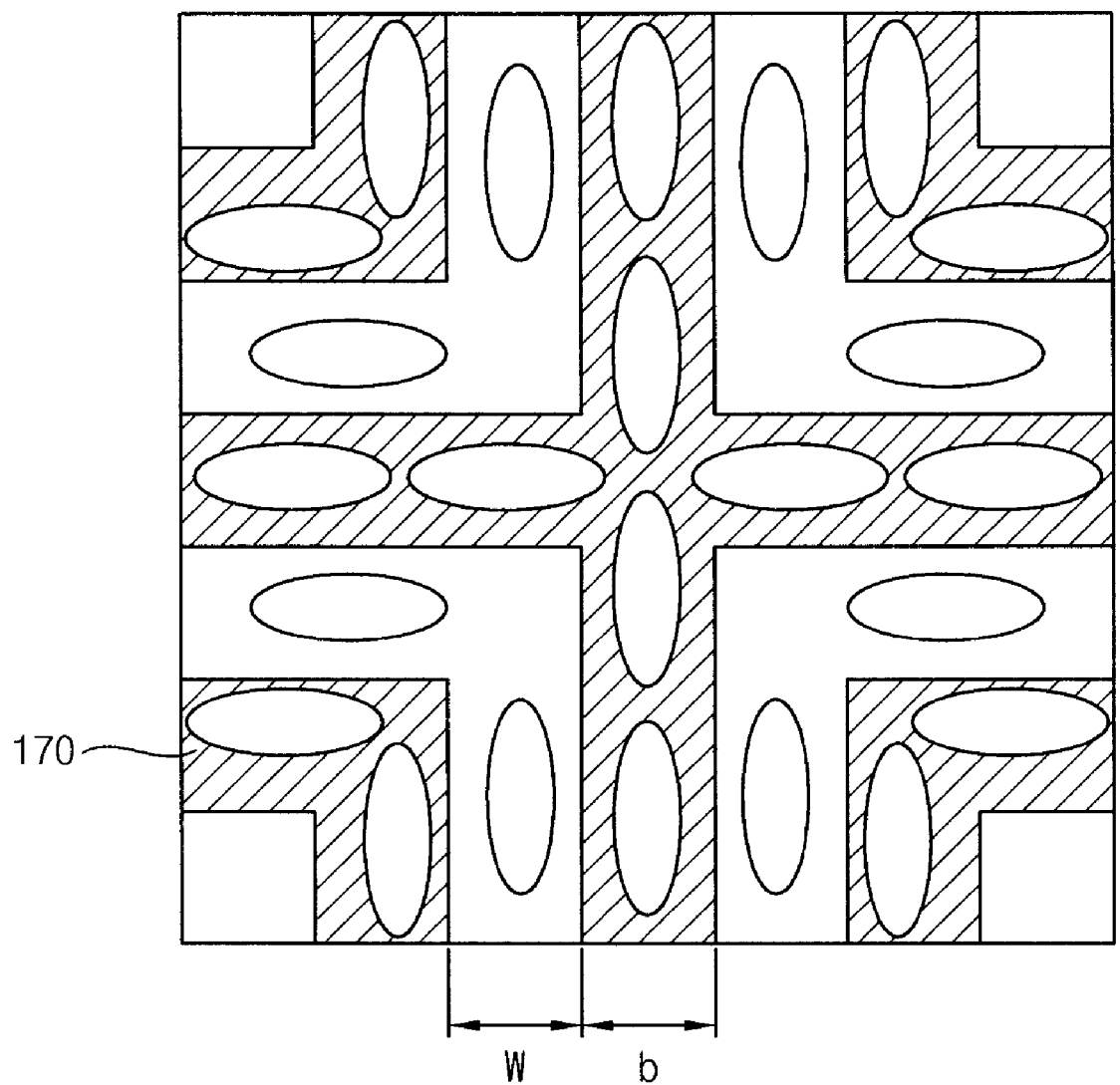
FIGS. 19A and 19B are top plan layout views illustrating a liquid crystal distribution of the exemplary embodiment of an LCD panel of FIG. 16 when an electric field is applied thereto.
Figure 19B:
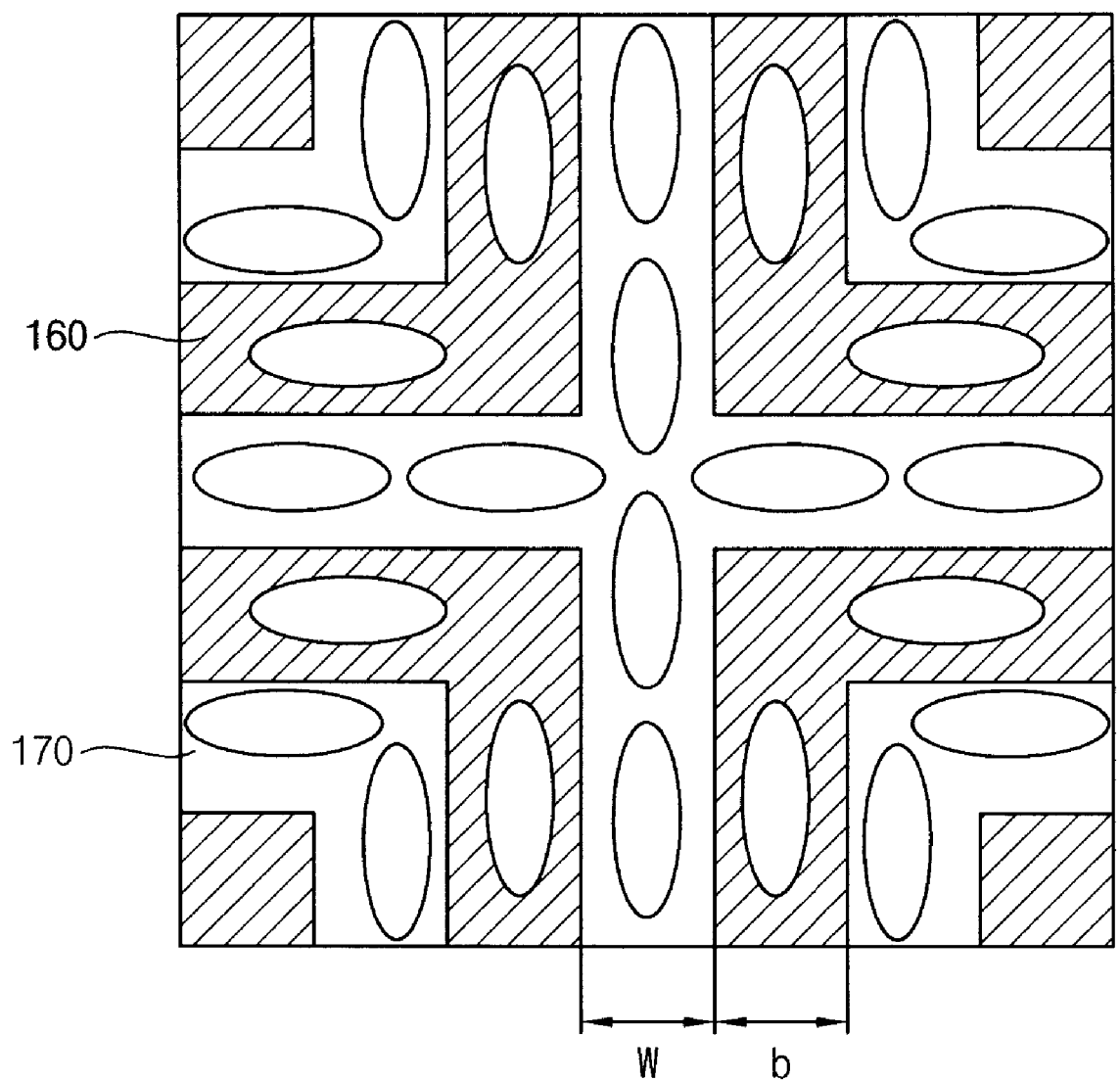

FIG. 18 is a cross-sectional view illustrating a liquid crystal distribution of the exemplary embodiment of an LCD panel of FIG. 16 when an electric field is applied thereto. FIGS. 19A and 19B are top plan layout views illustrating a liquid crystal distribution of the exemplary embodiment of an LCD panel of FIG. 1 when an electric field is applied thereto.

Referring to FIGS. 18, 19A and 19B, liquid crystals LC are initially aligned in a vertical direction at the reflective area RA and the transmissive area TA. When an electric field is formed, the liquid crystals LC are aligned along a long axis of the slit electrode E1. Thus, the LCD panel may have high transmissivity and high reflectivity.

Moreover, when an electric field is applied to the liquid crystals LC, fringe field electric fields that are symmetric to each other are generated at a corner portion of the slit electrode due to the slit electrode E1 in the transmissive area TA. Accordingly, the liquid crystals LC are initially aligned to face with each other with respect to a short axis direction of the slit electrode E1, and the liquid crystals LC are aligned along a long axis direction of the slit electrode E1 when an electric field is applied to the liquid crystals LC. Thus, a disclination line due to liquid crystal alignment defects is not generated, so that the LCD panel may have high transmissivity.

Moreover, in the reflective area RA, the transparent electrode 170 having the slit electrode E1 is disposed between a first common electrode 231 of a planar structure and a reflective electrode 160 of a planar structure, so that a strong fringe field electric field is generated at an edge portion of the slit electrode E1. Accordingly, the liquid crystals LC are uniformly aligned along a long axis direction of the slit electrode E1, so that a reflectivity may be increased. In one exemplary embodiment, a width W1 of the slit electrode E1 and a distance b1 between the slit electrodes E1 are no more than about 10 μm.

Moreover, when an electric field is applied to the liquid crystals LC, the liquid crystals LC are aligned along a long axis direction in the reflective area RA and the transmissive area TA. Accordingly, the long axis direction of the slit electrode E1 may be at least two directions, so that alignment directions of the liquid crystals LC are symmetric to each other so that light viewing characteristics may be enhanced. The long axis direction of the slit electrode E1 may be formed in various directions.

Furthermore, in one exemplary embodiment a multiplication of a cell gap 'dt' of the liquid crystal layer 300 by a refractive index Δn of liquid crystal molecules may be about 0.25 μm to about 0.6 μm in the transmissive area TA, and a multiplication of a cell gap 'dr' of the liquid crystal layer 300 by a refractive index Δn of liquid crystal molecules may be no more than abut 0.3 μm in the reflective area RA.

According to exemplary embodiments of the present invention, a pixel electrode and/or a common electrode having a plurality of slit electrodes formed thereon align liquid crystal in a long axis direction of the slit electrode, so that high transmissivity and high reflectivity may be obtained. Moreover, a wide viewing angle may be obtained.

Moreover, a reactive mesogenic hardened layer having a pretilt angle corresponding to the reflective mode is formed in the reflective area, and a reactive mesogenic hardened layer having a pretilt angle corresponding to the transmissive mode is formed in the transmissive area using the first and second common electrodes spaced apart from each other in correspondence with a reflective area and a transmissive area, so that a threshold voltage of a V-R curve and a threshold voltage of a V-T curve may be corresponding to each other.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A liquid crystal display panel comprising:
an array substrate comprising:
a pixel electrode disposed in a pixel area, the pixel electrode including a reflective electrode disposed in a reflective area of the pixel area and a transparent electrode disposed in a transmissive area of the pixel area, at least one of the reflective electrode and the transparent electrode including a plurality of first slit electrodes;
an opposite substrate comprising:
a first common electrode disposed in alignment with the reflective area, the first common electrode including a plurality of second slit electrodes having a width substantially equal to or wider than that of an individual first slit electrode of the plurality of first slit electrodes; and
a liquid crystal layer interposed between the array substrate and the opposite substrate,
wherein the reflective electrode is closer to the opposite substrate than the transparent electrode.

2. The liquid crystal display panel of claim 1, wherein a width of the individual first slit electrode is less than about 10 μm and a distance between adjacent first slit electrodes is less than about 10 μm.

3. The liquid crystal display panel of claim 1, wherein the plurality of first slit electrodes has a plurality of long axis directions and the plurality of second slit electrodes has a plurality of long axis directions.

4. The liquid crystal display panel of claim 1, further comprising a second common electrode spaced apart from the first common electrode and disposed in alignment with the transmissive area.

5. The liquid crystal display panel of claim 4, wherein the second common electrode has a planar structure.

6. The liquid crystal display panel of claim 1, wherein the liquid crystal layer comprises:
a first hardened layer including a reactive mesogenic monomer hardened on a first alignment layer of the array substrate; and
a second hardened layer including a reactive mesogenic monomer hardened on a second alignment layer of the opposite substrate.

7. The liquid crystal display panel of claim 6, wherein the first hardened layer has a first pretilt angle corresponding to the reflective area and a second pretilt angle corresponding to the transmissive area, and
the second hardened layer has a third pretilt angle corresponding to the reflective area and a fourth pretilt angle corresponding to the transmissive area.

8. The liquid crystal display panel of claim 1, wherein a width of the second slit electrode is about 0.5 μm to about 2 μm, when a width of the first slit electrode is about 1 μm.

9. The liquid crystal display panel of claim 1, wherein a multiplication of a cell gap of the liquid crystal layer by a refractive index Δn of liquid crystal molecules is about 0.25 μm to about 0.6 μm in the transmissive area, and a multiplication of a cell gap of the liquid crystal layer by a refractive index Δn of liquid crystal molecules is no more than about 0.3 μm in the reflective area.

10. A liquid crystal display panel comprising:
an array substrate having a pixel area which is divided into the reflective area and a transmissive area, the array substrate comprising:
a reflective electrode disposed in the reflective area; and
a transmissive electrode disposed in substantially the entire pixel area in alignment with the reflective electrode, the transmissive electrode having a plurality of slit electrodes;
an opposite substrate disposed substantially opposite to the transmissive electrode, and comprising a common electrode; and
a liquid crystal layer interposed between the array substrate and the opposite substrate,
wherein the reflective electrode is closer to the opposite substrate than the transmissive electrode disposed in the transmissive area.

11. The liquid crystal display panel of claim 10, wherein the array substrate further comprises an insulation layer disposed between the reflective electrode and the plurality of slit electrodes.

12. The liquid crystal display panel of claim 10, wherein a width an individual slit electrode of the plurality of slit electrodes is less than about 10 μm and a distance between adjacent slit electrodes of the plurality of slit electrodes is less than about 10 μm.

13. The liquid crystal display panel of claim 10, wherein the plurality of slit electrodes has a plurality of long axis directions.

14. The liquid crystal display panel of claim 10, wherein the common electrode comprises:
a first common electrode disposed in alignment with the reflective area: and
a second common electrode spaced apart from the first common electrode and disposed in alignment with the transmissive area.

15. The liquid crystal display panel of claim 14, wherein the first and second common electrodes have a planar structure.

16. The liquid crystal display panel of claim 15, wherein the liquid crystal layer comprises:
a first hardened layer including a reactive mesogenic monomer hardened on a first alignment layer of the array substrate; and
a second hardened layer including a reactive mesogenic monomer hardened on a second alignment layer of the opposite substrate.

17. The liquid crystal display panel of claim 16, wherein the first hardened layer has a first pretilt angle corresponding to the reflective area and a second pretilt angle corresponding to the transmissive area, and
the second hardened layer has a third pretilt angle corresponding to the reflective area and a fourth pretilt angle corresponding to the transmissive area.

18. The liquid crystal display panel of claim 10, wherein a multiplication of a cell gap of the liquid crystal layer by a refractive index Δn of liquid crystal molecules is about 0.25 μm to about 0.6 μm in the transmissive area, and a multiplication of a cell gap of the liquid crystal layer by a refractive index Δn of liquid crystal molecules is no more than about 0.3 μm in the reflective area.

* * * * *